US010836342B2

(12) United States Patent
Hayashi et al.

(10) Patent No.: US 10,836,342 B2
(45) Date of Patent: Nov. 17, 2020

(54) AIRBAG FOR HEAD PROTECTION

(71) Applicant: TOYODA GOSEI CO., LTD., Kiyosu (JP)

(72) Inventors: Shinji Hayashi, Kiyosu (JP); Masaaki Okuhara, Kiyosu (JP); Takashi Iida, Kiyosu (JP); Ryosuke Jinnai, Kiyosu (JP); Kunihiro Aikawa, Kiyosu (JP); Sho Ikenohata, Kiyosu (JP); Jun Sato, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 99 days.

(21) Appl. No.: 16/167,661

(22) Filed: Oct. 23, 2018

(65) Prior Publication Data

US 2019/0126882 A1    May 2, 2019

(30) Foreign Application Priority Data

Oct. 31, 2017   (JP) .................................. 2017-211146
Oct. 31, 2017   (JP) .................................. 2017-211147
Aug. 30, 2018   (JP) .................................. 2018-161903

(51) Int. Cl.
*B60R 21/232*   (2011.01)
*B60R 21/213*   (2011.01)
(Continued)

(52) U.S. Cl.
CPC .......... *B60R 21/232* (2013.01); *B60R 21/213* (2013.01); *B60R 21/233* (2013.01);
(Continued)

(58) Field of Classification Search
CPC .............. B60R 21/232; B60R 21/2346; B60R 21/2338; B60R 21/237; B60R 21/213;
(Continued)

(56) References Cited

U.S. PATENT DOCUMENTS 6,296,272 B1    10/2001   Heigl
6,394,487 B1 *   5/2002   Heudorfer ............. B60R 21/232
                                                  280/729

(Continued)

FOREIGN PATENT DOCUMENTS

JP    2001-505846 A    5/2001
JP        3966777 B2   6/2007
WO   2013/161626 A1  10/2013

*Primary Examiner* — Timothy Wilhelm
(74) *Attorney, Agent, or Firm* — Posz Law Group, PLC

(57) ABSTRACT

An airbag includes a bag body and an inlet port section of inflation gas. As a gas receivable region, the bag body includes a front main inflatable region, a rear main inflatable region, a feed path that feeds the inflation gas from the inlet port section to the front and rear main inflatable regions, and a sub inflatable region that absorbs the gas from the front main inflatable region when a pressure of the front main inflatable region soars. A front partitioning region partitions the front main inflatable region from the sub inflatable region. The front partitioning region is disposed in front of a front end of an upper partitioning region in an island-like fashion remote from other uninflatable region so as to provide, at the rear of and there beneath, one each communication passage that provides gas communication between the front main inflatable region and the sub inflatable region.

11 Claims, 13 Drawing Sheets

(51) Int. Cl.
  *B60R 21/2342* (2011.01)
  *B60R 21/231* (2011.01)
  *B60R 21/233* (2006.01)
  *B60R 21/2346* (2011.01)
  *B60R 21/2338* (2011.01)
  *B60R 21/237* (2006.01)
  *B60R 21/235* (2006.01)

(52) U.S. Cl.
  CPC ........ *B60R 21/237* (2013.01); *B60R 21/2338* (2013.01); *B60R 21/2342* (2013.01); *B60R 21/2346* (2013.01); *B60R 21/23138* (2013.01); *B60R 2021/2358* (2013.01); *B60R 2021/23308* (2013.01); *B60R 2021/23316* (2013.01); *B60R 2021/23386* (2013.01)

(58) Field of Classification Search
  CPC .......... B60R 21/2342; B60R 21/23138; B60R 21/233; B60R 2021/23316; B60R 2021/23386; B60R 2021/23308; B60R 2021/2358
  See application file for complete search history.

(56) References Cited

U.S. PATENT DOCUMENTS

| | | | | |
|---|---|---|---|---|
| 6,435,543 B1* | 8/2002 | Magoteaux | ........... | B60R 21/232 280/730.2 |
| 6,450,527 B2* | 9/2002 | Kobayashi | ............ | B60R 21/232 280/729 |
| 6,460,879 B2* | 10/2002 | Tanase | ................ | B60R 21/213 280/730.2 |
| 6,554,314 B1* | 4/2003 | Uchiyama | ............. | B60R 21/232 280/730.2 |
| 6,612,612 B2* | 9/2003 | Zerbe | ................... | B60R 21/232 280/730.2 |
| 6,736,422 B2* | 5/2004 | Nakanishi | ............ | B60R 21/231 280/730.2 |
| 6,758,492 B2* | 7/2004 | Tesch | ................... | B60R 21/232 280/730.2 |
| 6,843,502 B2* | 1/2005 | Aoki | ..................... | B60R 21/04 280/730.2 |
| 6,877,768 B2* | 4/2005 | Fujiwara | ............... | B60R 21/232 280/730.2 |
| 6,932,386 B2* | 8/2005 | Ikeda | ................... | B60R 21/232 280/730.2 |
| 6,971,665 B2* | 12/2005 | Tanaka | ................. | B60R 21/232 280/729 |
| 7,077,425 B2* | 7/2006 | Ogawa | .................. | B60R 21/213 280/730.2 |
| 7,080,853 B2* | 7/2006 | Ogata | .................. | B60R 21/232 280/730.2 |
| 7,168,735 B2* | 1/2007 | Kino | .................... | B60R 21/213 280/730.2 |
| 7,198,293 B2* | 4/2007 | Olson | .................. | B60R 21/232 280/730.2 |
| 7,322,600 B2* | 1/2008 | Inoue | .................. | B60R 21/232 280/730.2 |
| 7,407,182 B2* | 8/2008 | Aoki | ..................... | B60R 21/201 280/728.1 |
| 7,658,402 B2* | 2/2010 | Ohba | .................... | B60R 21/232 280/730.2 |
| 7,789,418 B2* | 9/2010 | Wipasuramonton | ........................ | B60R 21/232 280/729 |
| 7,883,112 B2* | 2/2011 | Wold | .................... | B60R 21/232 280/743.1 |
| 7,942,441 B2* | 5/2011 | Magnin | ................. | B60R 21/232 280/740 |
| 7,963,552 B2* | 6/2011 | Tanaka | ................. | B60R 21/232 280/730.2 |
| 8,006,999 B2* | 8/2011 | Suemitsu | ............. | B60R 21/2346 280/728.2 |
| 8,025,308 B2* | 9/2011 | Fletcher | ................ | B60R 21/232 280/730.2 |
| 8,025,309 B2* | 9/2011 | Steinbach | ............ | B60R 21/237 280/730.2 |
| 8,033,568 B2* | 10/2011 | Tanaka | ................... | B60R 21/232 280/729 |
| 8,267,423 B2* | 9/2012 | Wipasuramonton | ........................ | B60R 21/232 280/730.2 |
| 8,360,467 B2* | 1/2013 | Sato | ..................... | B60R 21/213 280/730.2 |
| 8,360,468 B2* | 1/2013 | Sato | ..................... | B60R 21/232 280/730.2 |
| 8,382,151 B2* | 2/2013 | Kalandek | ............. | B60R 21/232 280/728.2 |
| 8,414,014 B2* | 4/2013 | Nogami | ................. | B60R 21/213 280/728.2 |
| 8,414,021 B2* | 4/2013 | Tanaka | ................ | B60R 21/2334 280/730.2 |
| 8,424,906 B2* | 4/2013 | Ochiai | .................. | B60R 21/232 280/730.2 |
| 8,485,549 B2* | 7/2013 | Yamamura | ............ | B60R 21/213 280/729 |
| 8,573,638 B2* | 11/2013 | Hayashi | ................ | B60R 21/214 280/728.2 |
| 8,579,322 B2* | 11/2013 | Saimura | ................ | B60R 21/233 280/729 |
| 8,590,926 B2* | 11/2013 | Saimura | .............. | B60R 21/2346 280/730.2 |
| 8,608,193 B1* | 12/2013 | Wysocki | ................ | B60R 21/233 280/730.2 |
| 8,662,533 B2* | 3/2014 | Wipasuramonton | ........................ | B60R 21/232 280/730.2 |
| 8,770,618 B2* | 7/2014 | Fukawatase | ........ | B60R 21/2342 280/729 |
| 8,789,845 B2* | 7/2014 | Kato | ..................... | B60R 21/232 280/729 |
| 8,801,030 B2* | 8/2014 | Sugimori | .............. | B60R 21/213 280/730.2 |
| 8,851,508 B1* | 10/2014 | Rickenbach | .......... | B60R 21/232 280/729 |
| 8,905,432 B2* | 12/2014 | Nakashima | ........... | B60R 21/233 280/729 |
| 8,955,875 B2* | 2/2015 | Maita | .................... | B60R 21/213 280/730.2 |
| 9,004,527 B2* | 4/2015 | Kato | ..................... | B60R 21/232 280/729 |
| 9,067,564 B2* | 6/2015 | Kemp | ................... | B60R 21/231 |
| 9,096,193 B2* | 8/2015 | Kalandek | ............. | B60R 21/232 |
| 9,150,184 B2* | 10/2015 | Volkmann | ............. | B60R 21/201 |
| 9,211,863 B2* | 12/2015 | Kashio | .................. | B60R 21/232 |
| 9,216,711 B2* | 12/2015 | Kawamura | ............ | B60R 21/217 |
| 9,371,053 B2* | 6/2016 | Moberg | ................ | B60R 21/237 |
| 9,415,742 B1* | 8/2016 | Sasakura | .............. | B60R 21/2346 |
| 9,421,941 B2* | 8/2016 | Jo | ......................... | B60R 21/232 |
| 9,487,178 B2* | 11/2016 | Kawamura | ........... | B60R 21/232 |
| 9,487,179 B2* | 11/2016 | Takedomi | ........... | B60R 21/2334 |
| 9,505,371 B2* | 11/2016 | Kawamura | .......... | B60R 21/2334 |
| 9,539,978 B2* | 1/2017 | Mazanek | ............... | B60R 21/2338 |
| 9,566,935 B2* | 2/2017 | Hicken | ................. | B60R 21/232 |
| 9,610,916 B2* | 4/2017 | Kawamura | ............ | B60R 21/232 |
| 9,731,676 B2* | 8/2017 | Nagasawa | ........... | B60R 21/2346 |
| 9,783,150 B2* | 10/2017 | Saiki | .................... | B60R 21/232 |
| 9,862,349 B2* | 1/2018 | Fujiwara | ............... | B60R 21/232 |
| 9,908,499 B2* | 3/2018 | Low | ...................... | B60R 21/232 |
| 9,914,423 B2* | 3/2018 | Kim | ..................... | B60R 21/213 |
| 9,919,675 B2* | 3/2018 | Kim | ..................... | B60R 21/232 |
| 9,950,686 B2* | 4/2018 | Hiraiwa | ............... | B60R 21/23138 |
| 9,956,935 B2* | 5/2018 | Kawamura | ............ | B60R 21/232 |
| 9,956,936 B2* | 5/2018 | Ikenohata | ............. | B60R 21/232 |
| 9,963,102 B1* | 5/2018 | Ballam | .................. | B60R 21/232 |
| 9,994,187 B2* | 6/2018 | Okuhara | ............... | B60R 21/232 |
| 10,000,174 B2* | 6/2018 | Okuhara | ............... | B60R 21/2338 |
| 10,000,178 B2* | 6/2018 | Fukawatase | ...... | B60R 21/23138 |
| 10,017,146 B2* | 7/2018 | Sugimori | .............. | B60R 21/232 |
| 10,071,703 B2* | 9/2018 | Ikenohata | ........... | B60R 21/2334 |

(56) References Cited

U.S. PATENT DOCUMENTS

| | | | |
|---|---|---|---|
| 10,081,328 B2* | 9/2018 | Choi | B60R 21/216 |
| 10,207,669 B2* | 2/2019 | Konaka | B60R 21/213 |
| 10,214,173 B2* | 2/2019 | Asada | B60R 21/232 |
| 10,493,943 B2* | 12/2019 | Sugimori | B60R 21/2338 |
| 10,501,044 B2* | 12/2019 | Moon | B60R 21/232 |
| 2001/0026062 A1* | 10/2001 | Kosugi | B60R 21/232 280/730.2 |
| 2005/0116451 A1* | 6/2005 | Kino | B60R 21/232 280/730.2 |
| 2005/0167957 A1* | 8/2005 | Kumagai | B60R 21/232 280/730.2 |
| 2005/0212270 A1* | 9/2005 | Wipasuramonton | B60R 21/232 280/730.2 |
| 2006/0012156 A1* | 1/2006 | Boxey | B60R 21/232 280/730.2 |
| 2006/0208466 A1* | 9/2006 | Kirby | B60R 21/232 280/730.2 |
| 2006/0255570 A1* | 11/2006 | Wipasuramonton | B60R 21/232 280/729 |
| 2008/0197611 A1* | 8/2008 | Kabata | B60R 21/232 280/730.2 |
| 2012/0256402 A1* | 10/2012 | Kato | B60R 21/213 280/730.2 |
| 2012/0313356 A1* | 12/2012 | Saimura | B60R 21/233 280/730.2 |
| 2015/0097360 A1* | 4/2015 | Ochiai | B60R 21/232 280/730.2 |
| 2015/0314746 A1* | 11/2015 | Okuhara | B60R 21/235 280/728.2 |
| 2016/0082918 A1* | 3/2016 | Muzzaffar | B60R 21/232 280/743.1 |
| 2017/0282839 A1* | 10/2017 | Nonoyama | B60R 21/232 |

* cited by examiner

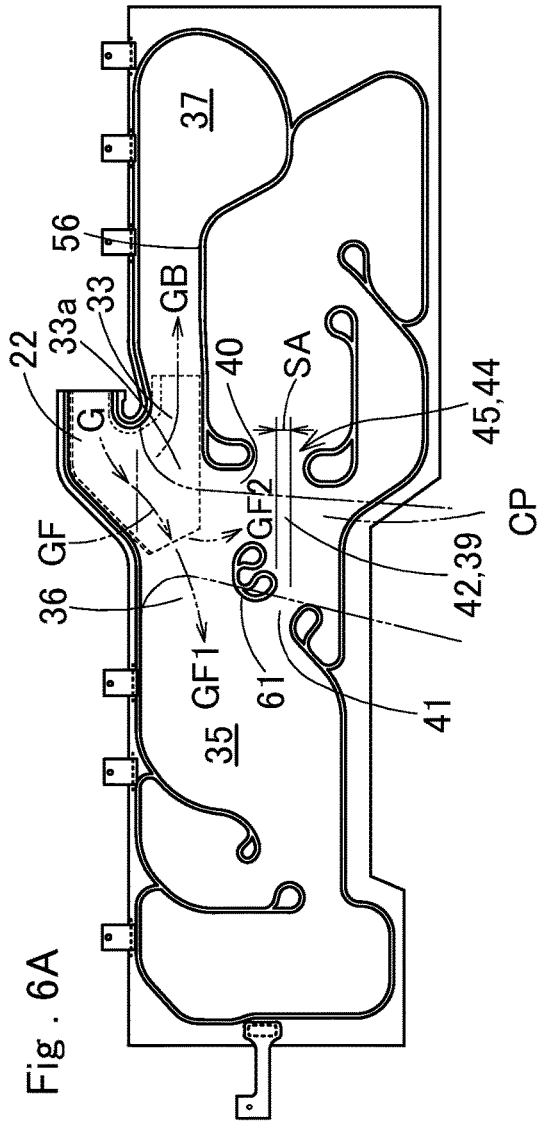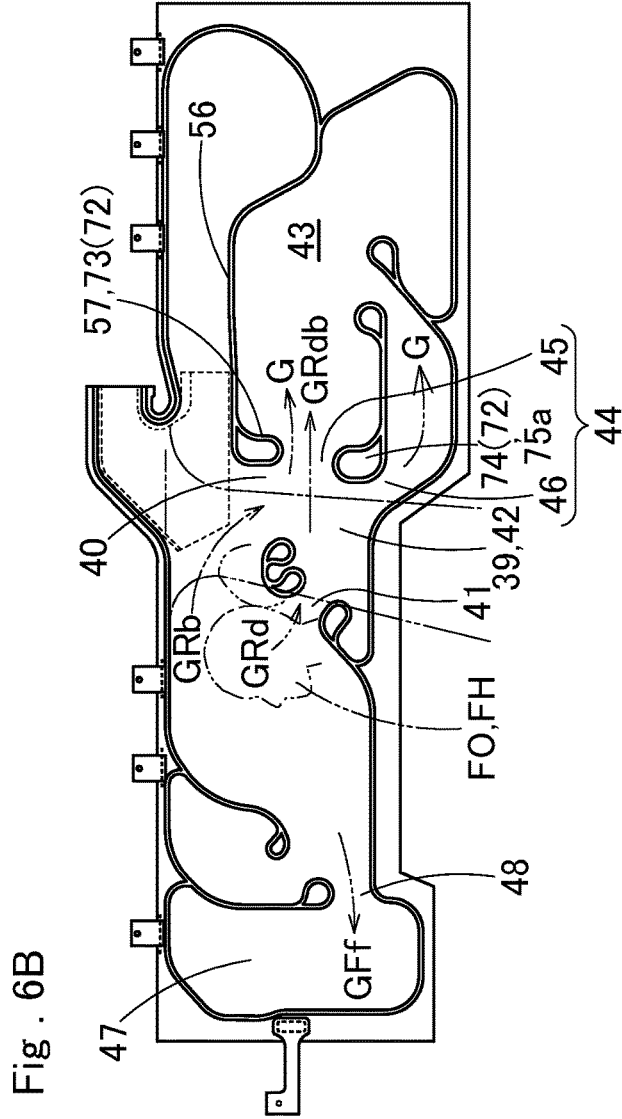

AIRBAG FOR HEAD PROTECTION

CROSS REFERENCE TO RELATED APPLICATIONS

The present application claims priority from Japanese Patent Application No. 2017-211146 of Hayashi et al., filed on Oct. 31, 2017, Japanese Patent Application No. 2017-211147 of Hayashi et al., filed on Oct. 31, 2017, Japanese Patent Application No. 2018-161903 of Hayashi et al., filed on Aug. 30, 2018, the entire disclosures of which are incorporated herein by reference.

BACKGROUND OF THE INVENTION

1. Field of the Invention

The present invention relates to an airbag for head protection that is adapted to be mounted on an upper periphery of a window of a vehicle in a folded-up configuration and deployable over an inboard side of the window when fed with an inflation gas.

2. Description of Related Art

As disclosed in JP 3966777 B and WO 2013/161626 A1, a conventional airbag employed in a head-protecting airbag device includes a front main inflatable region which is deployable on an outboard side of a head of a vehicle occupant sitting in a front seat and a rear main inflatable region which is deployable on an outboard side of a head of a vehicle occupant sitting in a rear seat. The airbag further includes a sub inflatable region which is designed to absorb an inflation gas from the front main inflatable region so as to suppress soaring of an internal pressure of the front main inflatable region when the front main inflatable region catches the occupant. The sub inflatable region is disposed between the front main inflatable region and rear main inflatable region.

However, in the conventional airbag for head protection, there is only one communication passage between the front main inflatable region and sub inflatable region. This configuration is favorable in that the inflation gas is suppressed from escaping to the sub inflatable region and thus a smooth expansion of the front main inflatable region is encouraged in an initial stage of airbag deployment. However, it is also likely that the sub inflatable region cannot receive enough inflation gas from the main inflatable region immediately and cannot lower the pressure of the front main inflatable region quickly when an internal pressure of the front main inflatable region is raised.

SUMMARY OF THE INVENTION

The present invention contemplates a solution to the above-mentioned problem, and has an object to provide an airbag for head protection which ensures a quick expansion of the front main inflatable region and also ensures a quick removal of the inflation gas from the front main inflatable region to the sub inflatable region at elevation of an internal pressure of the front main inflatable region.

The airbag for head protection of the invention is adapted to be stored, in a folded-up configuration, in a storage space disposed along upper peripheries of windows located at outboard sides of a front seat and a rear seat of a vehicle. The airbag includes a bag body that emerges from the storage space and is deployed over the windows in an interior of the vehicle when fed with an inflation gas, and an inlet port section that is disposed at a vicinity of a center in a front and rear direction of an upper edge of the bag body for connection with an inflator which feeds the inflation gas.

The bag body includes an inboard side wall, an outboard side wall, a gas receivable region that is inflatable with the inflation gas by separating the inboard side wall from the outboard side wall, and a non-receptive region in which the inboard side wall and outboard side wall are attached together such that no inflation gas is admitted.

The gas receivable region includes:

a front main inflatable region that is deployable in a vicinity of an outboard side of the front seat;

a rear main inflatable region that is deployable in a vicinity of an outboard side of the rear seat;

a gas feed path that is in gas communication with the inlet port section and disposed along the upper edge of the bag body, the gas feed path being in gas communication with the front main inflatable region and the rear main inflatable region in order to deliver the inflation gas as come over from the inlet port section to the front and rear main inflatable regions; and a sub inflatable region that is disposed beneath the gas feed path and absorbs the inflation gas from the front main inflatable region when an internal pressure of the front main inflatable region soars.

The non-receptive region includes a peripheral region that is arranged in an outer peripheral edge of the bag body, an upper partitioning region that partitions the sub inflatable region from the gas feed path, and a front partitioning region that partitions the sub inflatable region from the front main inflatable region. The front partitioning region is disposed in front of a front end of the upper partitioning region in an island-like fashion remote from other members of the non-receptive region so as to provide, at the rear of and beneath the front partitioning region, a rear gas communication passage and a lower gas communication passage that each provide gas communication between the front main inflatable region and the sub inflatable region.

When the airbag for head protection of the invention is fed with an inflation gas, the gas flows towards the front main inflatable region and rear main inflatable region via the inlet port section and the gas feed path. The gas which is released from a front end of the gas feed path and heads towards the front main inflatable region reaches the front main inflatable region for the most part, because the front partitioning region, which is disposed in an island-like fashion in front of the upper partitioning region and partitions the front main inflatable region from the sub inflatable region, interferes with the gas which tries to head towards the sub inflatable region. Thus the front main inflatable region completes inflation and deployment quickly. When the front main inflatable region catches an occupant and gets the internal pressure raised thereafter, with no more inflow of the gas from the inlet port section, the inflation gas in the front main inflatable region flows into the sub inflatable region in a bifurcate fashion via the lower gas communication passage disposed beneath the front partitioning region as well as via the rear gas communication passage disposed at the rear of the front partitioning region and between the front partitioning region and upper partitioning region. That is, the inflation gas in the front main inflatable region flows into the sub inflatable region via the two passages disposed beneath and at the rear of the front partitioning region, thus suppressing the internal pressure of the front main inflatable region from soaring quickly.

Therefore, the airbag for head protection of the invention ensures a quick expansion of the front main inflatable region and ensures a quick removal of the inflation gas from the front main inflatable region to the sub inflatable region at elevation of an internal pressure of the front main inflatable region.

In the airbag for head protection of the invention, it is desired that the front partitioning region is disposed in front of the front end of the upper partitioning region and below the gas feed path, because such a front partitioning region will be less likely to interfere with an inflation gas released forward from the gas feed path, such that the gas will flow into the front main inflatable region immediately. It is also desired that, in the bag body as laid such that the inboard side wall and outboard side wall lie flat over each other, a width of a gas passage formed between the front partitioning region and an upper portion of the peripheral region is greater than a width of the rear gas communication passage.

With the above configuration, the gas passage formed between the front partitioning region and the upper portion of the peripheral region located there above is an inlet of inflation gas of the front main inflatable region, and the inlet is greater in width than the rear gas communication passage which serves as an inlet of inflation gas of the sub inflatable region. Accordingly, a greater portion of the inflation gas exiting the gas feed path flows into the front main inflatable region, thus inflating the front main inflatable region quickly. Needless to say, when the front main inflatable region as fully inflated catches an occupant and gets the internal pressure raised thereafter, the inflation gas in the front main inflatable region flows into the sub inflatable region in a bifurcate fashion via the lower gas communication passage and rear gas communication passage disposed beneath and at the rear of the front partitioning region, thus suppressing the internal pressure of the front main inflatable region from soaring quickly.

The airbag for head protection of the invention is desirably provided with such an inner tube that is disposed in an area extending across the inlet port section and a region of the gas feed path in a vicinity of the inlet port section, and includes a front outlet port that releases an inflation gas towards the front main inflatable region and a rear outlet port that releases an inflation gas towards the rear main inflatable region. Further, it is desired that front partitioning region is disposed proximate to the front outlet port of the inner tube.

With this configuration, when an inflation gas exits the front outlet port of the inner tube, the front partitioning region disposed proximate thereto is able to help ensure an enough flow rate of an inflation gas heading towards the front main inflatable region, thus the front main inflatable region is inflated further quickly.

In the airbag for head protection of the invention, it is also desired that the non-receptive region of the bag body includes, below the front partitioning region, an upturned extended region that extends upwardly from a lower portion of the peripheral region and defines a width of the lower gas communication passage disposed beneath the front partitioning region.

Such an upturned extended region prevents an inflation gas in the front main inflatable region from escaping to the sub inflatable region via the lower gas communication port until the front main inflatable region completes inflation. That is, the upturned extended region controls a flow rate of the inflation gas flowing into the sub inflatable region via the lower gas communication port in a stage before full inflation of the front main inflatable region, thus helping inflate the front main inflatable region further quickly.

In the airbag for head protection of the invention, it is also desired that the bag body further includes, in front of the front main inflatable region, a second sub inflatable region that absorbs the inflation gas from the front main inflatable region when the internal pressure of the front main inflatable region soars.

With this configuration, when the front main inflatable region catches an occupant and gets the internal pressure raised, not only the sub inflatable region disposed at the rear of the front main inflatable region but also the second sub inflatable region disposed in front of the front main inflatable region absorb the inflation gas, thus suppressing elevation of the internal pressure further quickly.

It is further desired that the front partitioning region is formed into such a shape that includes a generally round upper terminal portion, a generally round lower terminal portion and a connecting portion that connects the upper terminal portion and lower terminal portion, the lower terminal portion being disposed at a diagonally lower front position of the upper terminal portion, and the connecting portion connecting the upper terminal portion and lower terminal portion at edges facing away from the sub inflatable region such that a recessed region is formed adjacent the sub inflatable region in such a manner as to dent towards a direction away from the sub inflatable region between the upper and lower terminal portions.

Such a recessed region of the front partitioning region serves as an additional inflatable region at a rear portion of the front partitioning region, and can increase a protecting area of the bag body though not sufficiently thick. Further, since the connecting portion connects the upper terminal portion and lower terminal portion on a side facing away from the sub inflatable region and forms no recessed area, the front partitioning region guides an inflation gas smoothly towards the front main inflatable region.

It is also desired that the lower edge of the sub inflatable region is disposed below the lower edge of the front main inflatable region. The sub inflatable region thus configured has a great volume and is capable of absorbing a considerable amount of the inflation gas from the front main inflatable region, thus is excellent in suppression of elevation of internal pressure of the front main inflatable region.

It is also desired that a rear portion of the sub inflatable region overlap with at least a front portion of the rear main inflatable region in an up and down direction. This configuration is conducive to increase a length in a front and rear direction of the sub inflatable region as well as a volume of the sub inflatable region despite of the arrangement that the sub inflatable region is disposed between the front main inflatable region and rear main inflatable region. With this configuration, the sub inflatable region is capable of absorbing a considerable amount of the inflation gas from the front main inflatable region, thus is excellent in suppression of elevation of internal pressure of the front main inflatable region.

It is desired that the sub inflatable region includes a pillar-covering portion that is deployable at an inboard side of a pillar disposed between the front seat and the rear seat, a main body that is disposed at the rear of the pillar-covering portion, and a partition that belongs to the non-receptive region and partitions the pillar-covering portion from the main body while providing a gas communication port between the pillar-covering portion and the main body. It is further desired that the lower gas communication passage disposed beneath the front partitioning region overlaps the above gas communication port in a front and rear direction.

When the front main inflatable region is fully inflated, a portion of the inflation gas escapes to the pillar-covering portion of the sub inflatable region via the lower gas communication passage and rear gas communication passage and inflates the pillar-covering portion even before the front main inflatable region catches an occupant. The pillar-covering portion thus inflated would be capable of catching an occupant in the event that he moves towards the pillar. Further, when the front main inflatable region as fully inflated catches an occupant and raises the internal pressure, the inflation gas escapes, from the front main inflatable region, to the main body of the sub inflatable region via the pillar-covering portion. At this time, with the above-described configuration, the gas flowing through the lower gas communication passage rearward is able to flow into the main body directly via the gas communication port with no need to be redirected. Therefore, the suppression of surge of internal pressure of the front main inflatable region will be further quickly conducted.

In the above instance, it is desired that a middle partitioning region, which belong to the non-receptive region, is disposed at a generally center in an up and down direction of the main body of the sub inflatable region and extends in a front and rear direction, the middle partitioning region dividing the gas communication port that provides gas communication between the pillar-covering portion and the main body into an upper port and a lower port. The upper port is disposed above a front edge of the middle partitioning region and the lower port is disposed beneath the front edge of the middle partitioning region.

Although the gas communication port between the main body and pillar-covering portion of the sub inflatable region is great in opening width, the middle partitioning region divides the gas communication port into two, thus prevents the main body from absorbing a great deal of inflation gas from the pillar-covering portion when the pillar-covering portion is inflated before the front main inflatable region as fully inflated catches an occupant. Thus this configuration helps inflate the pillar-covering portion quickly. It will be understood that the main body of the sub inflatable region will quickly absorb an inflation gas from the front main inflatable region via the upper port and lower port of the gas communication port, when an internal pressure of the front main inflatable region soars. The middle partitioning region further helps reduce the thickness of the main body of the sub inflatable region compared with those of the main inflatable regions despite of its great volume, thus helps deploy the main body smoothly with little engagement with surrounding vehicle members.

The rear gas communication passage disposed at the rear of the front partitioning region may be configured smaller in width than the lower gas communication passage as the bag body is laid flat such that the inboard side wall and outboard side wall lie flat over each other. With this configuration, the rear gas communication passage with the small width helps suppress an amount of inflation gas flowing into the sub inflatable region in an initial stage of airbag deployment in which the bag body takes in an inflation gas from the inlet port section. Accordingly, an amount of inflation gas heading towards the front main inflatable region will be increased and the front main inflatable region will be inflated quickly.

In the above instance, the airbag is desirably provided with such an inner tube that is disposed in an area extending across the inlet port section and a region of the gas feed path in a vicinity of the inlet port section, and includes a front outlet port that releases the inflation gas towards the front main inflatable region and a rear outlet port that releases the inflation gas towards the rear main inflatable region. Further, it is desired that the front partitioning region is disposed farther rearward than and proximate to the front outlet port of the inner tube.

With this configuration, since the front partitioning region is disposed farther rearward than and proximate to the front outlet port of the inner tube, an inflation gas released from the front outlet port flows into the front main inflatable region and inflates the same quickly with little interference with the front partitioning region. The inflation gas can hardly flow towards the rear gas communication passage disposed at the rear of the front partitioning region even in the initial stage of airbag deployment in which the airbag takes in an inflation gas via the inlet port section, such that the front main inflatable region is inflated quickly. When the front main inflatable region as fully inflated catches an occupant and gets the internal pressure raised thereafter, the inflation gas in the front main inflatable region flows into the sub inflatable region via the two passages, i.e. the lower gas communication passage and rear gas communication passage disposed beneath and at the rear of the front partitioning region. Thus the internal pressure of the front main inflatable region is prevented from soaring quickly.

Also in the airbag of the above configuration, it is desired that the non-receptive region of the bag body further includes, at a lower front position of the front partitioning region, an upturned extended region that extends upwardly from a lower portion of the peripheral region and defines a width of the lower gas communication passage disposed beneath the front partitioning region.

Such an upturned extended region prevents an inflation gas as flown into the front main inflatable region from escaping to the sub inflatable region via the lower gas communication port until the front main inflatable region completes inflation. That is, in a stage before full inflation of the front main inflatable region, the upturned extended region controls a flow rate of an inflation gas flowing into the sub inflatable region via the lower gas communication port, thus helping inflate the front main inflatable region further quickly.

BRIEF DESCRIPTION OF DRAWINGS

FIG. 6A illustrates a flow of an inflation gas as a front main inflatable region is inflated;

FIG. 6B illustrates a flow of the inflation gas from the front main inflatable region to a sub inflatable region at elevation of an internal pressure of the front main inflatable region;

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
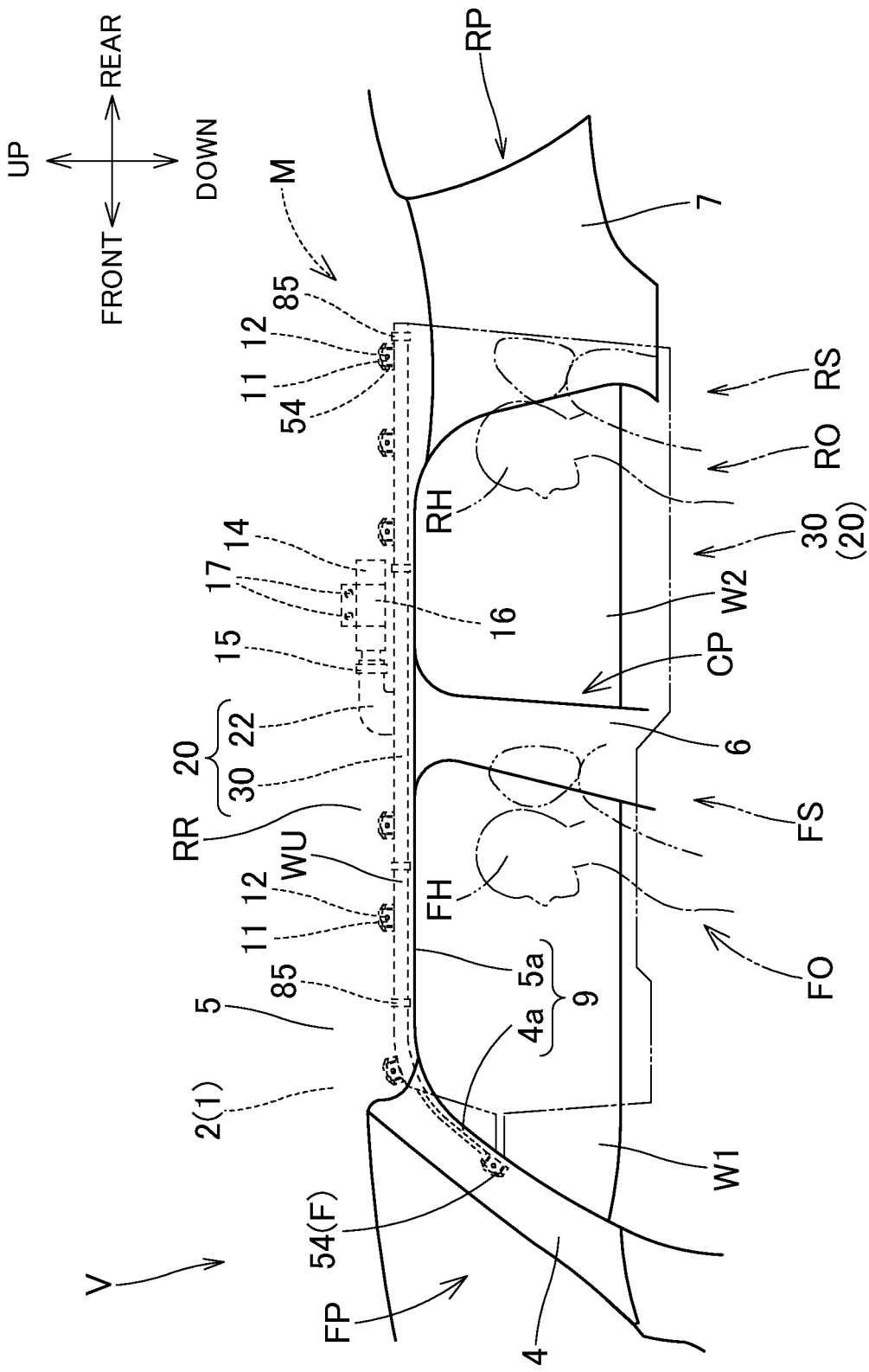
FIG. 1 is a schematic front elevation of an airbag device for head protection which employs an airbag embodying the invention, as viewed from an interior of a vehicle.

An airbag 20 embodying the invention is for use in an airbag device M for head protection. As shown in FIG. 1, the airbag device M is mounted on a vehicle V which has two rows of seats, i.e. front seats FS and rear seats RS, and two windows W1 and W2 each disposed on an outboard side of the front seat FS and rear seat RS. The airbag device M includes an airbag 20, an inflator 14, a plurality of mounting brackets 11, a mounting bracket 16 and an airbag cover 9. The airbag 20 is adapted to be stored in the upper peripheries WU of windows W1 and W2 inside the vehicle V in a folded-up configuration. Specifically, the airbag 20 is disposed at an area ranging from a lower rim 4a of a front pillar FP through a region above a rear pillar RP, via a lower rim 5a of a roof side rail RR.

The airbag cover 9 is composed of the lower rim 4a of a front pillar garnish 4 arranged on the front pillar FP and the lower rim 5a of a roof head liner 5 arranged on the roof side rail RR. The front pillar garnish 4 and roof head liner 5 are each fabricated of synthetic resin, and secured to an inboard side of an inner panel 2, a part of a vehicle body structure 1, at the front pillar FP and roof side rail RR. The airbag cover 9 covers an inboard side of the airbag 20 stored in a folded-up configuration, and is designed to open towards an interior of the vehicle V when pushed by the airbag 20 as actuated.

The inflator 14 is designed to feed the airbag 20 with an inflation gas. The inflator 14 is substantially cylindrical in outer contour and includes not-shown gas discharge ports at the leading end (front end) region. The leading end region of the inflator 14 including the gas discharge ports is inserted into a later-described inlet port section 22 of the airbag 20, and a clamp 15 is used to fasten the inlet port section 22 and inflator 14, thus the inflator 14 is coupled with the airbag 20. The mounting bracket 16 holds the inflator 14. Held by the mounting bracket 16, the inflator 14 is secured to the inner panel 2 at a position above the window W2 through the use of bolts 17 which fasten the mounting bracket 16 to the inner panel 2, as shown in FIG. 1. The inflator 14 is electrically connected to a not-shown control device of the vehicle V through a not-shown lead wire, and is designed to be actuated by an actuating signal fed from the control device as has detected a side impact, an oblique impact or a rollover of the vehicle V.

Each of the mounting brackets 11 is composed of a pair of plates of sheet metal. Each of the mounting brackets 11 is mounted on each of later-described mounting regions 54 of the airbag 20 on both sides, and is used to mount the mounting regions 54 on the inner panel 2 of the vehicle body structure 1 with the aid of bolts 12, as shown in (A) of FIG. 13.

As shown in FIGS. 1 to 5, the airbag 20 includes a bag body 30 and an inlet port section 22. The bag body 30 is designed to emerge from a storage space disposed at the upper peripheries WU of the windows W1 and W2 and cover the windows W1 and W2 when fed with an inflation gas G. The inlet port section 22 is disposed at a vicinity of the center in a front and rear direction of the upper edge of the bag body 30 for connection with the inflator 14 to feed an inflation gas G to the bag body 30.

The inlet port section 22 includes an insertion region 23 for receiving the inflator 14 and a root region 24 which extends downward from the front end of the insertion region 23 and adjoins the bag body 30. The insertion region 23 includes an opening 23a at the rear end, for receiving the inflator 14. That is, the inlet port section 22 is designed such that an inflation gas G enters the opening 23, flows towards the front end, then to the root region 24.

The airbag 20 of the illustrated embodiment is composed by one-piece woven technology of polyamide yarn or the like except the mounting regions 54, thus the bag body 30 and inlet port section 22 are integral.

Figure 2:
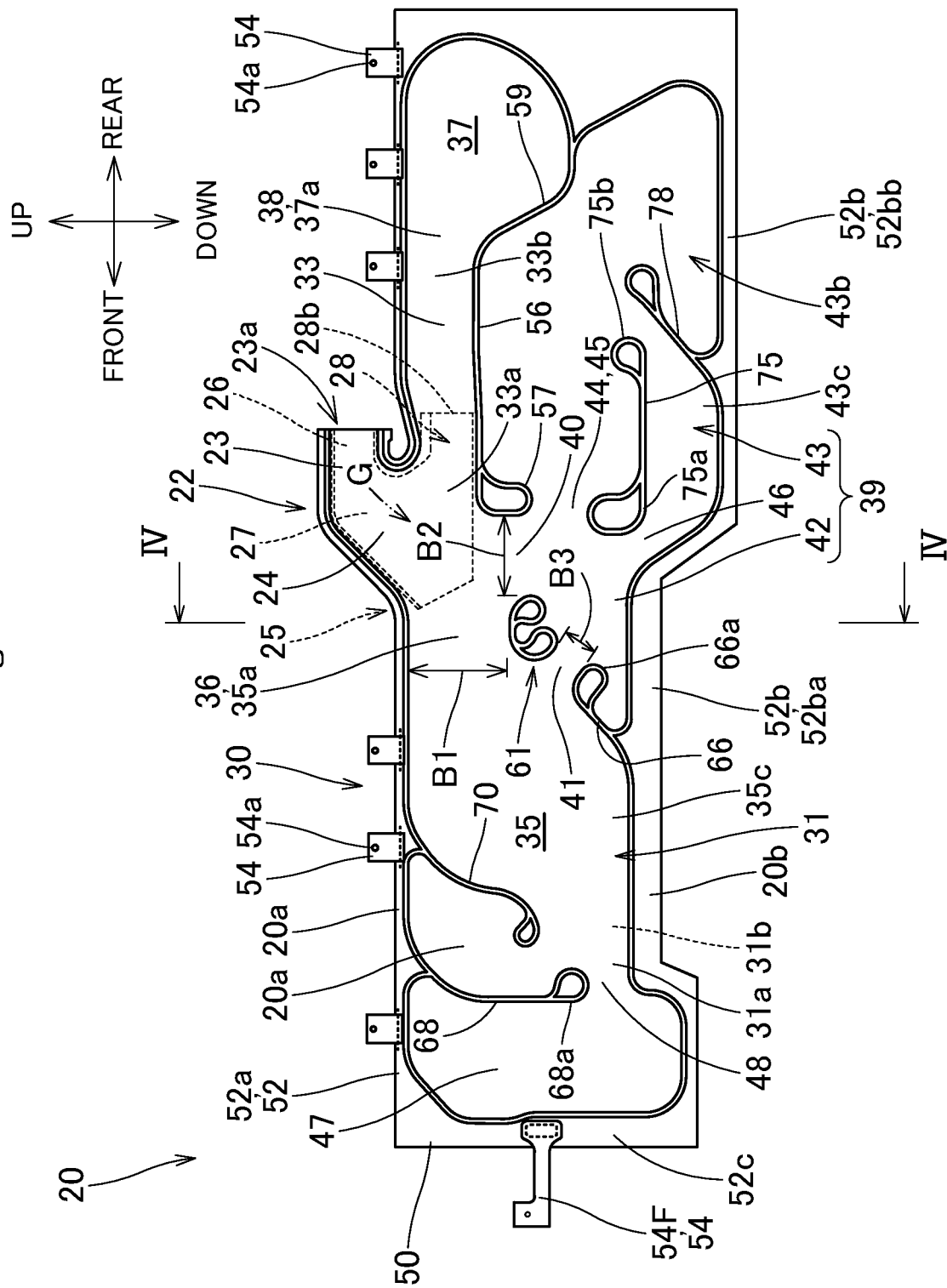
FIG. 2 is a plan view of an airbag embodying the invention as unfolded.
Figure 3:
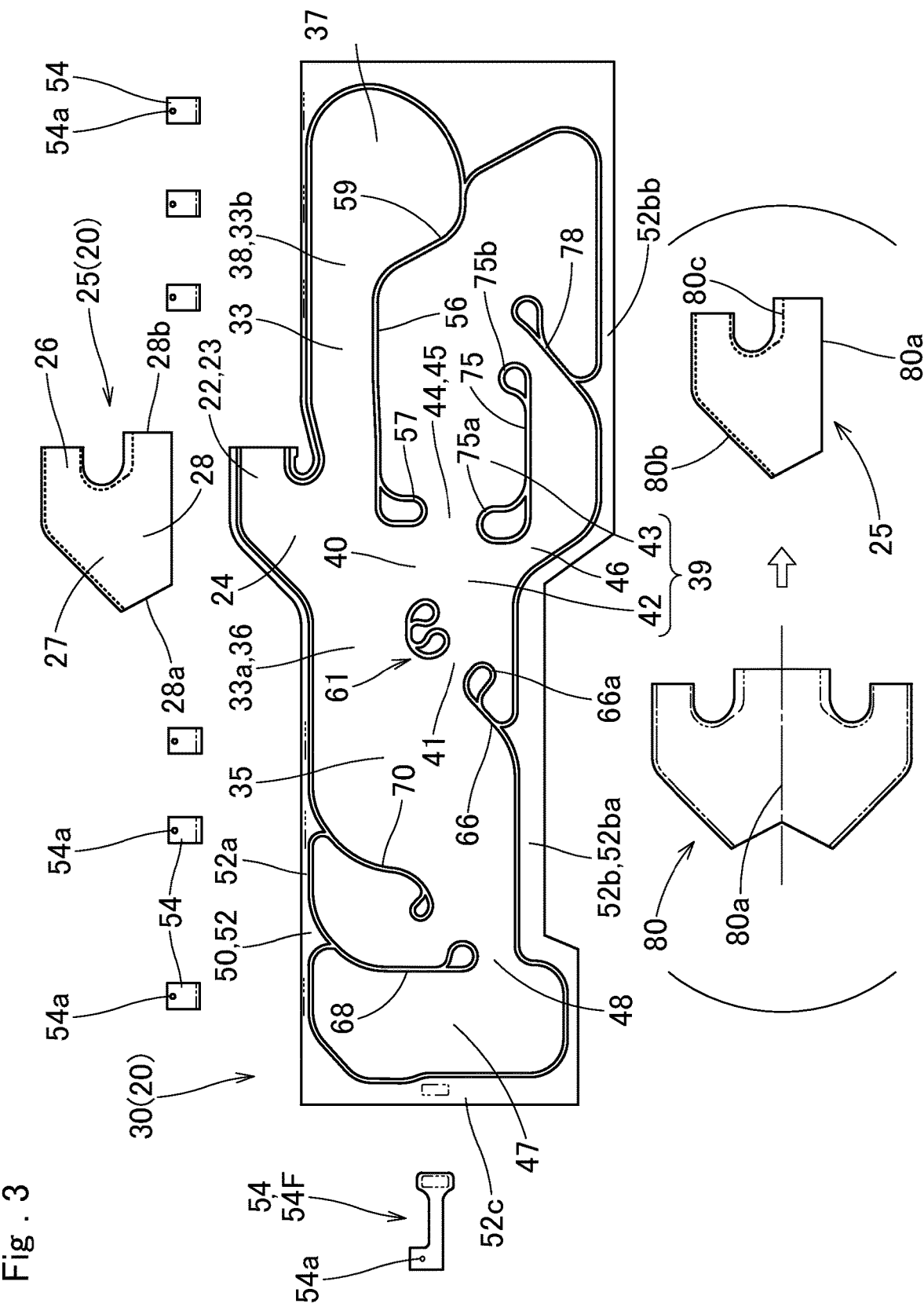
FIG. 3 depicts a bag body and an inner tube of the airbag of FIG. 2 in plan views.
Figure 4:
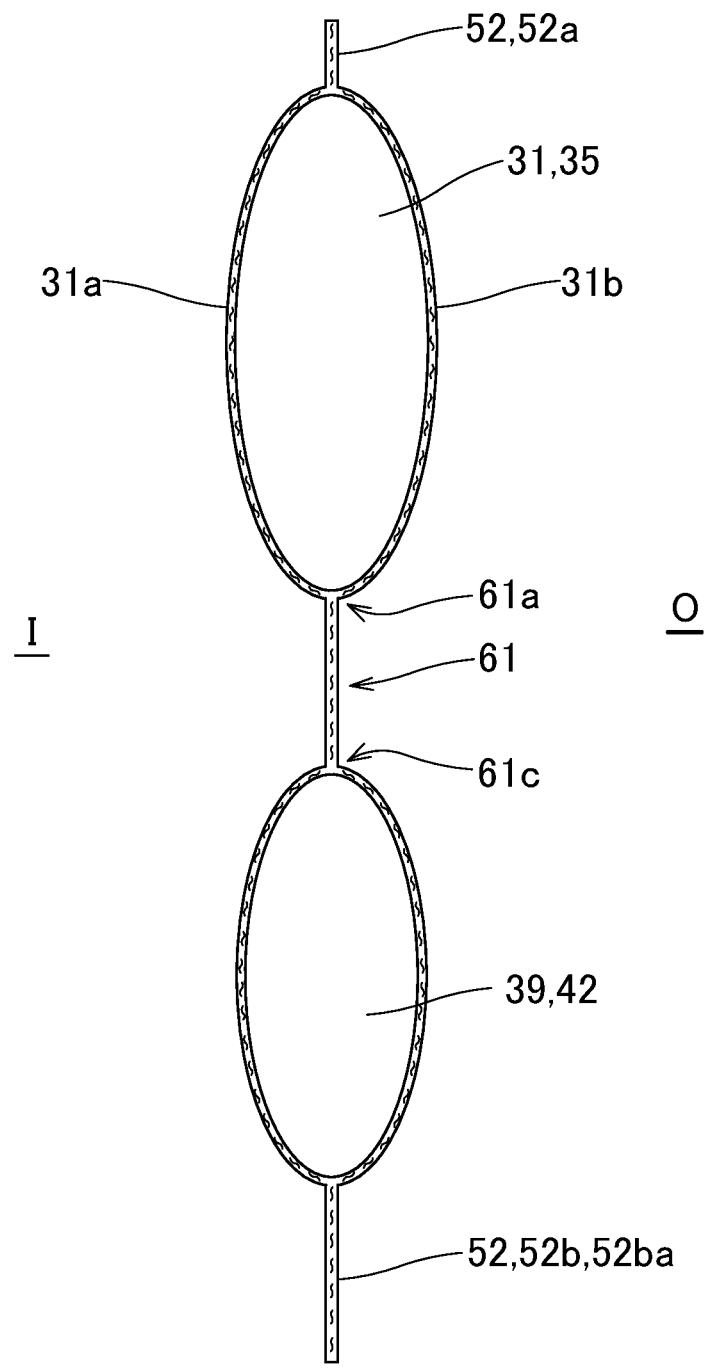
FIG. 4 is a sectional view taken along line IV-IV of FIG. 2 of the airbag as inflated by itself.

As shown in FIG. 2, an inner tube 25 is disposed inside the airbag 20, in an area extending across the inlet port section 22 and a region of a later-described gas feed path 33 in a vicinity of the inlet port section 22. The inner tube 25 enhances heat resistance of the inlet port section 22 and its vicinity.

The inner tube 25 includes an insertion region 26 disposed inside the insertion region 23 of the inlet port section 22, a root region 27 disposed inside the root region 24 of the inlet port section 22, and an outlet region 28 disposed below the root region 27 in such a manner as to extend along a front and rear direction. The outlet region 28 is formed into a tube having a front outlet port 28a and a rear outlet port 28b for releasing an inflation gas towards the front and rear, and disposed in a vicinity of the front end 33a of the later-described gas feed path 33. More specifically, the front outlet port 28a is formed into an opening which faces obliquely downward, with the lower edge 28ab (FIG. 5) disposed farther rearward than the upper edge 28aa. The inner tube 25 is composed of a base cloth 80 (FIG. 3), woven fabric of polyamide yarns or the like. The inner tube 25 is formed by folding the base cloth 80 in half on a crease 80a, disposing the crease 80a at the lower edge of the outlet region 28, and sewing mated front upper edges and rear edges of the base cloth 80 together with an upper seam 80b and a rear seam 80c.

As can be seen in FIGS. 2 to 5, the bag body 30 includes a gas receivable region 31 that is inflatable with an inflation gas G by separating an inboard side wall 31a from an outboard side wall 31b, and a non-receptive region 50 in which the inboard side wall 31a and outboard side wall 31b are attached together such that no inflation gas is admitted.

The gas receivable region 31 includes a front main inflatable region 35, a rear main inflatable region 37, a gas feed path 33, and a sub inflatable region 39. The gas receivable region 31 of the illustrated embodiment further includes a second sub inflatable region 47.

The front main inflatable region 35 is designed to be deployed at a side of the front seat FS for protecting a head FH (FIG. 1) of an occupant FO sitting in the front seat FS in the event of a side impact of the vehicle V. The rear main inflatable region 37 is designed to be deployed at a side of the rear seat RS for protecting a head RH (FIG. 1) of an occupant RO sitting in the rear seat RS in the event of a side impact of the vehicle V. The gas feed path 33 is disposed along the upper edge of the bag body 30, in gas communication with the inlet port section 22. The gas feed path 33 is also in gas communication with an upper rear end 35a of the front main inflatable region 35 and an upper front end 37a of the rear main inflatable region 37 in order to deliver the inflation gas G as come over from the inlet port section 22 to the front and rear main inflatable regions 35 and 37.

The sub inflatable region 39 is disposed beneath the gas feed path 33. The sub inflatable region 39 is designed to absorb the inflation gas G from the front main inflatable region 35 when an internal pressure of the front main inflatable region 35 soars. The sub inflatable region 39 of the illustrated embodiment includes a pillar-covering portion 42 disposed in a front area and a main body 43 disposed in a rear area. The pillar-covering portion 42 is designed to be deployed at an inboard side of the center pillar CP disposed between the front seat FS and rear seat RS, and composed of an area disposed in front of a front end 57 of a later-described upper partitioning region 56 of the sub inflatable region 39. Referring to FIG. 5, the pillar-covering portion 42 and main body 43 is partitioned by a line which connects the front end 57 of the later-described upper partitioning region 56, a front end 75a of a later-described middle partitioning region 75 and a proximate portion 52bc of a lower portion 52b of a later-described peripheral region 52, which proximate portion 52bc is proximate to the front end 75a of the middle partitioning region 75. In other words, the pillar-covering portion 42 and main body 43 is partitioned by a sub inflatable region partitioning region (partition) 72 which includes an upper portion 73 and a lower portion 74. The upper portion 73 is composed of the front end 57 of the upper partitioning region 56, and the lower portion 74 is composed of the front end 75a of the middle partitioning region 75. The pillar-covering portion 42 and main body 43 communicate each other via a communication port 44, in the illustrated embodiment. Specifically, an upper port 45 disposed between the front end 57 and front end 75a and a lower port 46 disposed between the front end 75a and proximate portion 52bc of the lower portion 52b of the peripheral region 52 form the communication port 44. The main body 43 of the sub inflatable region 39 is designed to extend farther downward than the lower edge 35c of the front main inflatable region 35. Specifically, in the lower portion 52b of the peripheral region 52 of the non-receptive region 50, a rear portion 52bb is disposed below a front portion 52ba, as can be seen in FIGS. 2 and 5.

The second sub inflatable region 47 is disposed in front of the front main inflatable region 35. The second sub inflatable region 47 is designed to absorb the inflation gas G from the front main inflatable region 35 when the internal pressure of the front main inflatable region 35 soars.

The non-receptive region 50 includes a peripheral region 52, an upper partitioning region 56, and a front partitioning region 61. The non-receptive region 50 of the illustrated embodiment further includes an upturned extended region 66, an edge partitioning region 68, a linear shut region 70, a middle partitioning region 75, a linear shut region 78, and a rear partitioning region 59.

The peripheral region 52 is disposed in an outer peripheral edge of the bag body 30. In the illustrated embodiment, the peripheral region 52 is also disposed in a peripheral edge of the inlet port section 22 except the opening 23a for receiving the inflator 14. An upper portion 52a of the peripheral region 52 is provided with a plurality of mounting regions 54 which are used to mount the airbag 20 on the inner panel 2 of the vehicle body structure 1. Each of the mounting regions 54 is composed of a cloth member (fabric) of polyamide or the like separate from the bag body 30, and sewn to the peripheral region 52. A foremost mounting region 54F extends forward from a front portion 52c of the peripheral region 52. Each of the mounting regions 54 is provided with a mounting hole 54a for receiving the mounting bolt 12.

The upper partitioning region 56 partitions the sub inflatable region 39 from the gas feed path 33, and is disposed along a front and rear direction in a lower edge of the gas feed path 33. The upper partitioning region 56 continues to the rear partitioning region 59 which partitions the sub inflatable region 39 from the rear main inflatable region 37. The front end 57 of the upper partitioning region 56 bends downward in a hanging fashion, and is opposed to the front end 75a of a later-described middle partitioning region 75 in an up and down direction.

Figure 5A:
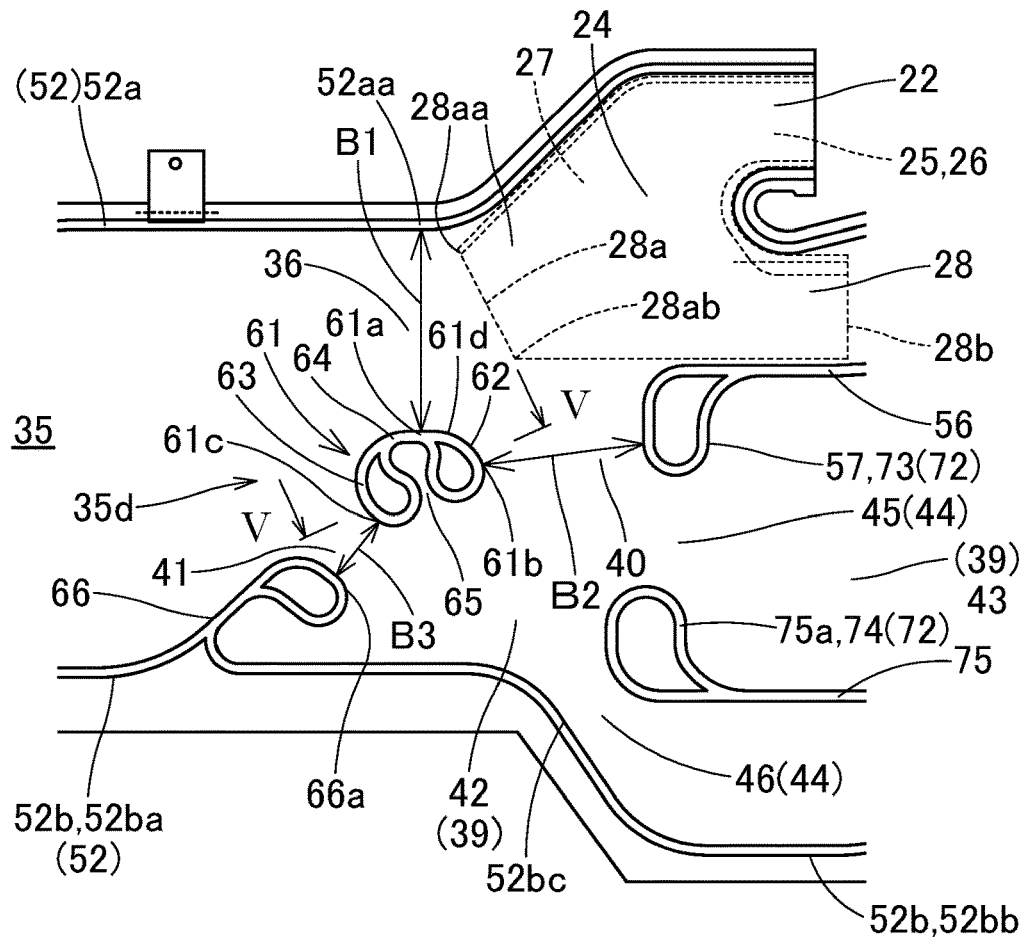
FIG. 5A is a partial enlarged front elevation of the airbag of FIG. 2 showing a front partitioning region and its vicinity.

The front partitioning region 61 partitions the sub inflatable region 39 from the front main inflatable region 35, and is disposed in front of the front end 57 of the upper partitioning region 56. The front partitioning region 61 is formed into an island remote from other members of the non-receptive region 50, such that a gas passage 40 and a gas passage 41 of an inflation gas G are formed at the rear of and beneath the front partitioning region 61. In the illustrated embodiment, moreover, the front partitioning region 61 is disposed below the gas feed path 39 (in other words, below an upper edge of the upper partitioning region 56) and in front of and in a vicinity of the root region 24 of the inlet port section 22, more particularly, beneath a portion 52aa of the upper portion 52a of the peripheral region 52 proximate to the inlet port section 22, as can be seen in FIG. 5A.

An additional passage 36 is formed between the front partitioning region 61 and the upper portion 52a of the peripheral region 52 in the bag body 30 as laid flat. As can be seen in FIG. 5A, a width B1 of the passage 36 is greater than a width B2 of the passage (namely, rear gas communication passage) 40 formed between the front partitioning region 61 and the front end 57 of the upper partitioning region 56. More particularly, the width B1 is approximately 170% as great as the width B2.

More specifically, the passage 36 is a portion disposed between the upper portion 52a of the peripheral region 52 (more particularly, the portion 52aa of the upper portion 52a of the peripheral region 52 disposed in front of and proximate to the inlet port section 22) and a portion 61a of the front partitioning region 61 closest to the upper portion 52a (namely, upper proximate portion 61a). The passage 36 serves as a gas inlet of the front main inflatable region 35. The width B1 is intended to refer to a width in an up and down direction of the passage 36 as the bag body 30 is laid flat.

The rear gas communication passage 40 is intended to refer to a passage which is disposed between the front end 57 of the upper partitioning region 56 and an upper rear end 61b of the front partitioning region 61 which is closest to the front end 57 (namely, a rear proximate portion 61b).

The passage 41, namely, a lower gas communication passage 41, is intended to refer to a passage which is disposed between an upper end 66a of the upturned extended region 66 and a portion 61c of the front partitioning region 61 which is closest to the upper end 66a (namely, a lower proximate portion 61c). In the illustrated embodiment, moreover, a rearward projected area SA of the lower gas communication passage 41 overlaps the upper inlet port (communication port) 45 of the main body 43 of the sub inflatable region 39 in a front and rear direction, as shown in FIG. 6A.

In terms of shape, the front partitioning region 61 includes an upper terminal portion 62, a lower terminal portion 63 and a connecting portion 64 which connects the upper and lower terminal portions 62 and 63. Each of the upper and lower terminal portions 62 and 63 has a generally round shape. The lower terminal portion 63 is disposed at a diagonally lower front position of the upper terminal portion 62. The connecting portion 64 connects upper edges of the terminal portions 62 and 63 facing away from the sub inflatable region 39 such that a recessed region 65 is formed between the terminal portions 62 and 63, denting forward and upwardly, i.e. towards a direction away from the sub inflatable region 39. The connecting portion 64 extends flat in a front and rear direction in a vicinity of the upper proximate portion 61a and bends downwardly towards the terminal portions 62 and 63, thus connecting the upper edges of terminal portions 62 and 63 while gently curving.

In the illustrated embodiment, the inner tube 25 is disposed in the area extending across the inlet port section 22 and gas feed path 33, as described above. The front partitioning region 61 is disposed below and proximate to the front outlet port 28a. More particularly, the front partitioning region 61 is disposed below, in front of and proximate to the lower edge 28ab of the front outlet port 28a, which lower edge 28ab is disposed farther rearward than the upper edge 28aa. An upper edge 61d of the front partitioning region 61, which is disposed generally at the center of an area between the upper proximate portion 61a and rear proximate portion 61b, is disposed immediately below the upper edge 28aa.

The upturned extended region 66 extends diagonally rearwardly and upwardly from a portion of the lower portion 52b of the peripheral region 52 positioned in front of and below the front partitioning region 61 in a linear fashion. An upper end 66a of the upturned extended region 66 bends rearward and is disposed in front of and below the front partitioning region 61, and defines an opening width (width) B3 of the lower gas communication passage 41 on the lower side. In the illustrated embodiment, the width B3 is approximately 40% as great as the width B2 of the rear gas communication passage 40. In the illustrated embodiment, a relationship among the opening widths (widths) B1, B2 and B3 of the gas passages 36, 40 and 41 is B1>B2>B3.

The edge partitioning region 68 partitions the front main inflatable region 35 from the second sub inflatable region 47, and extends downwardly from a front area of the upper portion 52a of the peripheral region 52. An inlet port 48 of an inflation gas G from the front main inflatable region 35 to the second sub inflatable region 47 is disposed between a lower end 68a of the edge partitioning region 68 and a front area 52ba of the lower portion 52b of the peripheral region 52.

The linear shut region 70 is disposed in a front area 35b of the front main inflatable region 35, and extends downwardly from the upper portion 52a of the peripheral region 52 at the rear of the edge partitioning region 68. The linear shut region 70 is provided for regulating a thickness (i.e. thickness in a vehicle width direction) of the front main inflatable region 35 at airbag deployment.

The middle partitioning region 75 is disposed in a front area of the main body 43 of the sub inflatable region 39 in such a manner as to extend in a front and rear direction. The front end 75a of the middle partitioning region 75 bends upwardly as well as the rear end 75b. As described above, the upper port 45 of the main body 43 is disposed between the front end 75a of the middle partitioning region 75 and the front end 57 of the upper partitioning region 56, and the lower port 46 of the main body 43 is disposed between the front end 75a of the middle partitioning region 75 and the proximate portion 52bc of the lower portion 52b of the peripheral region 52. The upper port 45 and lower port 45 form the communication ports or inlet ports 44 of the main body 43 via which the main body 43 takes in an inflation gas G from the pillar-covering portion 42 of the sub inflatable region 39.

The linear shut region 78 extends diagonally rearwardly and upwardly from an intermediate portion in a front and rear direction of a rear portion 52bb of the lower portion 52b of the peripheral region 52. The linear shut region 78 is provided for regulating a thickness (i.e. thickness in a vehicle width direction) of the main body 43 at airbag deployment.

Assembling of the airbag device M for head protection using the airbag 20 as well as mounting of the airbag device M on the vehicle V is now described.

Figure 12:
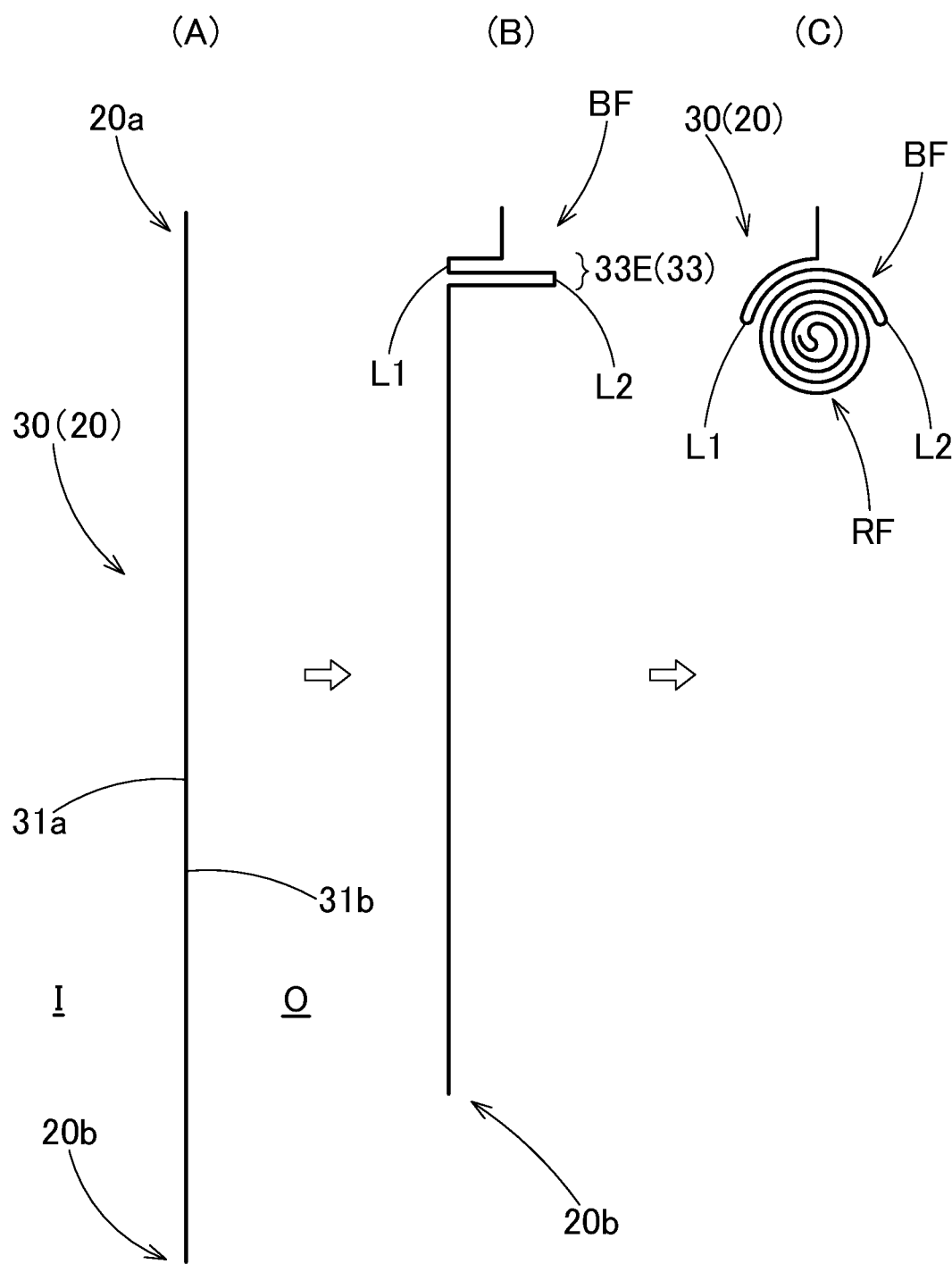
FIG. 12 illustrates a folding process of the airbag of FIG. 11.

The airbag 20 is so laid that the inboard side wall 31a and outboard side wall 31b lie flat over each other, then folded up in such a manner that the lower edge 20b is brought close to the upper edge 20a, as can be seen in FIG. 12. In the illustrated embodiment, the gas feed path 33 is folded in a concertina-like fashion on two creases (or folds) L1 and L2 extending generally in a front and rear direction, then an area below the gas feed path 33 is rolled on the outboard side wall 31b. The airbag 20 as folded up is bound with a shape-keeping member 85 (FIG. 1). Then the inflator 14 as coupled with the mounting bracket 16 is connected with the inlet port section 22 of the airbag 20 through the use of the clamp 15, and the mounting brackets 11 are attached to the mounting regions 54 of the airbag 20, thereby forming an airbag module. Subsequently, the mounting bracket 16 and mounting brackets 11 are placed at predetermined positions on the inner panel 2 of the vehicle body structure 1 and fixed there with the bolts 12 and 17. The inflator 14 is connected with a not-shown lead wire extending from the control device for actuating the inflator. If then the front pillar garnish 4, the roof head liner 5, pillar garnishes 6 and 7 are mounted on the inner panel 2, the airbag device M is mounted on the vehicle V.

When the airbag device M for head protection as mounted on board is actuated in the event of a side impact crash, an oblique impact crash or a rollover of the vehicle V, the inflator 14 is actuated and feeds an inflation gas G to the airbag 20. The gas G flows through the inlet port section 22, the gas feed path 33, into the front main inflatable region 35 and rear main inflatable region 37, which breaks the shape-keeping members 85. The airbag 20 then pushes and opens the airbag cover 9 composed of the lower rims 4a and 5a of the front pillar garnish 4 and roof head liner 5, unfolds and deploys downward, and covers the windows W1 and W2, front pillar FP, center pillar CP, and the rear pillar RP, as indicated with double-dotted lines in FIG. 1.

As can be seen in FIG. 6A, when the airbag 20 of the illustrated embodiment is fed with an inflation gas G, the gas G (GF, GB) flows towards the front main inflatable region 35 and rear main inflatable region 37 via the inlet port section 22 and the gas feed path 33. The gas GF, which is released from the front end 33a of the gas feed path 33 and heads towards the front main inflatable region 35, reaches the front main inflatable region 35 for the most part except a small portion GF2 escaping to the sub inflatable region 39, because the front partitioning region 61, which is disposed in an island-like fashion in front of the upper partitioning region 56 and partitions the front main inflatable region 35 from the sub inflatable region 39, interferes with the gas GF which tries to head towards the sub inflatable region 39. Thus the front main inflatable region 35 completes inflation and deployment quickly. When the front main inflatable region 35 catches the head FH of occupant FO and gets the internal pressure raised thereafter, with no more inflow of the gas G from the inlet port section 22, the inflation gas G in the front main inflatable region 35 bifurcates into GRd and GRb, each of which flows into the sub inflatable region 39 via the lower gas communication passage 41 disposed beneath the front partitioning region 61 as well as via the rear gas communication passage 40 disposed at the rear of the front partitioning region 61 and between the front partitioning region 61 and upper partitioning region 56, as shown in FIG. 6B. That is, the inflation gas G in the front main inflatable region 35 flows into the sub inflatable region 39 via the two passages 40 and 41 disposed beneath and at the rear of the front partitioning region 61, thus suppressing the internal pressure of the front main inflatable region 35 from soaring quickly.

Therefore, the airbag 20 for head protection of the illustrated embodiment ensures a quick expansion of the front main inflatable region 35 and ensures a quick removal of the inflation gas G from the front main inflatable region 35 to the sub inflatable region 39 at elevation of an internal pressure of the front main inflatable region 35.

In the airbag 20 for head protection of the illustrated embodiment, especially, the front partitioning region 61 is disposed in front of the front end 57 of the upper partitioning region 56 and below the gas feed path 33, and in the bag body 30 as laid such that the inboard side wall 31a and outboard side wall 31b lie flat over each other, the width B1 of the gas passage 36 formed between the front partitioning region 61 and the upper portion 52a of the peripheral region 52 is greater than the width B2 of the rear gas communication passage 40 formed between the front partitioning region 61 and upper partitioning region 56, as shown in FIGS. 2 and 5. In other words, the gas passage 36, which is formed between the upper end (upper proximate portion 61a) of the front partitioning region 61 and the upper portion 52a (52aa) of the peripheral region 52 located there above, is an inlet of inflation gas GF1 of the front main inflatable region 35, and the inlet 36 is greater in width than the rear gas communication passage 40 which serves as an inlet of inflation gas GF2 of the sub inflatable region 39. Accordingly, a greater portion of the inflation gas GF exiting the front end 33a of the gas feed path 33 flows into the front main inflatable region 35, thus inflating the front main inflatable region 35 quickly.

Needless to say, when the front main inflatable region 35 as fully inflated catches the head FH of occupant FO and gets the internal pressure raised thereafter, the inflation gas G in the front main inflatable region 35 bifurcates into GRd and GRb, each of which flows into the sub inflatable region 39 via the lower gas communication passage 41 and rear gas communication passage 40 disposed beneath and at the rear of the front partitioning region 61, thus suppressing the internal pressure of the front main inflatable region 35 from soaring quickly.

In the illustrated embodiment, the width B1 of the gas passage 36 disposed above the front partitioning region 61 is 1.7 times as great as the width B2 of the rear gas communication passage 40 disposed at the rear of the front partitioning region 61. If the width B1 approximates to the width B2, the front main inflatable region 35 will not be able to inflate quickly or protect the occupant O quickly. To the contrary, if the width B2 of the rear gas communication passage 40 is far smaller than the width B1, a flow rate of the inflation gas GRb flowing into the sub inflatable region 39 will not be enough to quickly suppress the elevation of the internal pressure of the front main inflatable region 35, especially when the width B3 of the lower gas communication passage 41 is even smaller as in the illustrated embodiment. In view of these points, the width B1 is preferably approximately 1.1 times to 2.9 times as great as the width B2, and, more preferably, approximately 1.4 times to 2.2 times as great as the width B2.

The airbag 20 for head protection in the illustrated embodiment further includes the inner tube 25 that is disposed in an area extending across the inlet port section 22 and a region of the gas feed path 33 in a vicinity of the inlet port section 22. The inner tube 25 includes the front outlet port 28a that feeds an inflation gas G towards the front main inflatable region 35 and the rear outlet port 28b that feeds the inflation gas towards the rear main inflatable region 37. The front partitioning region 61 is disposed proximate to the front outlet port 28a of the inner tube 25.

With this configuration, when an inflation gas GF exits the front outlet port 28a of the inner tube 25, the front partitioning region 61 disposed proximate thereto helps ensure an enough flow rate of an inflation gas GF1 heading towards the front main inflatable region 35, thus the front main inflatable region 35 is inflated further quickly.

In the airbag 20 of the illustrated embodiment, moreover, the non-receptive region 50 of the bag body 30 includes, at a lower front position of the front partitioning region 61, the upturned extended region 66 that extends upwardly from the lower portion 52b of the peripheral region 52 and defines the width B3 of the lower gas communication passage 41 disposed beneath the front partitioning region 61.

The upturned extended region 66 prevents an inflation gas GF1 which has been guided into the front main inflatable region 35 by the upper proximate portion 61a of the front partitioning region 61 from escaping to the sub inflatable region 39 via the lower gas communication port 41 until the front main inflatable region 35 complete inflation. That is, the upturned extended region 66 controls a flow rate of an inflation gas GRd flowing into the sub inflatable region 39 via the lower gas communication port 41 in a stage before full inflation of the front main inflatable region 35, thus helping inflate the front main inflatable region 35 further quickly.

The bag body 30 of the illustrated embodiment further includes the second sub inflatable region 47 that absorbs an inflation gas GFf (FIG. 6B) from the front main inflatable region 35 when the internal pressure of the front main inflatable region 35 soars. The second sub inflatable region 47 is disposed in front of the front main inflatable region 35.

With this configuration, when the front main inflatable region 35 catches the occupant FO and raises the internal pressure, not only the sub inflatable region 39 disposed at the rear of the front main inflatable region 35 but also the second sub inflatable region 47 disposed in front of the front main inflatable region 35 absorb the inflation gas G, thus suppressing elevation of the internal pressure further quickly.

In the airbag 20 of the illustrated embodiment, the front partitioning region 61 is formed into such a shape that includes the upper terminal portion 62, the lower terminal portion 63, both of which are generally round, and the connecting portion 64 that connects the upper terminal portion 62 and lower terminal portion 63. The lower terminal portion 63 is disposed at a diagonally lower front position of the upper terminal portion 62. The connecting portion 64 connects upper front edges, which are disposed apart from the sub inflatable region 39, of the upper terminal portion 62 and lower terminal portion 63 so as to provide a recessed region 65 that adjoins the sub inflatable region 39 and dents forward and upwardly, i.e. towards a direction away from the sub inflatable region 39.

Figure 5B:
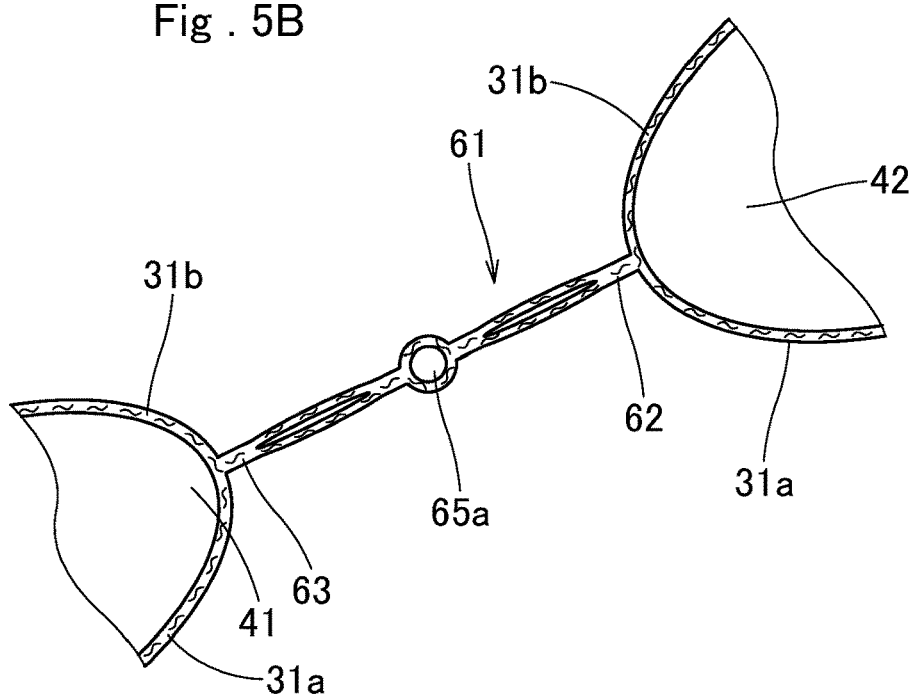
FIG. 5B is a schematic sectional view taken along line V-V as the airbag is inflated.

As shown in FIG. 5B, the recessed region 65 of the front partitioning region 61 can serve as an additional inflatable region 65*a* at the rear of the front main inflatable region 35, and increases a protecting area of the bag body 30 though not sufficiently thick. Further, since the connecting portion 64 smoothly connects the upper terminal portion 62 and lower terminal portion 64 at the upper front edge of the front partitioning region 61 and forms no recessed region, the front partitioning region 61 guides the inflation gas GF1 flowing by the upper front edge of the front partitioning region 61 smoothly towards the front main inflatable region 35.

In the illustrated embodiment, furthermore, the lower edge of the sub inflatable region 39 (i.e., the lower edge 43*c* of the main body 43) is disposed below the lower edge 35*c* of the front main inflatable region 35.

The sub inflatable region 39 thus configured is great in dimension in an up and down direction and has a great volume, thus is capable of absorbing a considerable amount of the inflation gas G (GRb, GRd) from the front main inflatable region 35. Accordingly, the suppression of elevation of internal pressure of the front main inflatable region 35 will be enhanced.

Moreover, the airbag 20 of the illustrated embodiment is configured such that a rear portion 43*b* of the main body 43 of the sub inflatable region 39 overlap with at least a front portion (upper front end portion) 37*a* of the rear main inflatable region 37 in an up and down direction.

This configuration is conducive to increase a length in a front and rear direction of the sub inflatable region 39 as well as a volume of the sub inflatable region 39 despite of the arrangement that the sub inflatable region 39 is disposed between the front main inflatable region 35 and rear inflatable region 37. With this configuration, the sub inflatable region 39 is capable of absorbing a considerable amount of the inflation gas G (GRb, GRd) from the front main inflatable region 35, thus is excellent in suppression of elevation of internal pressure of the front main inflatable region 35.

In the airbag 20 of the illustrated embodiment, the sub inflatable region 39 includes the pillar-covering portion 42 that is deployable at an inboard side of the center pillar CP disposed between the front seat FS and the rear seat RS, and the main body 43 that is disposed at the rear of the pillar-covering portion 42. The pillar-covering portion 42 and main body 43 is partitioned by the partition (sub inflatable region partitioning region) 72 that belongs to the non-receptive region 50. The partition 72 is provided with the gas communication port 44 which provides gas communication between the pillar-covering portion 42 and the main body 43. The lower gas communication passage 41 overlaps the gas communication port 44 (the upper port 45, in the illustrated embodiment) in a front and rear direction by the area SA, as shown in FIG. 6A.

When the front main inflatable region 35 is fully inflated, a portion of the inflation gas G (an inflation gas approximate to the inflation gases GRb, GRd) escapes to the pillar-covering portion 42 of the sub inflatable region 39 via the lower gas communication passage 41 and rear gas communication passage 40 and inflates the pillar-covering portion 42 even before the front main inflatable region 35 catches an occupant. The pillar-covering portion 42 thus inflated would be capable of catching an occupant in the event that he moves towards the center pillar CP. Further, when the front main inflatable region 35 as fully inflated catches an occupant and raises the internal pressure, the inflation gas G (as GRb, GRd) escapes, from the front main inflatable region 35, to the main body 43 of the sub inflatable region 39 via the pillar-covering portion 42. At this time, with the above-described configuration, the gas GRdb (FIG. 6B) flowing through the lower gas communication passage 41 rearward is able to flow into the main body 43 directly via the upper port 45 of the gas communication port 44 with no need to be redirected. Therefore, the suppression of surge of internal pressure of the front main inflatable region 35 will be further quickly conducted.

Moreover, in the airbag 20 of the illustrated embodiment, the middle partitioning region 75, which is the non-receptive region 50, is disposed at a generally center in an up and down direction of the gas communication port 44 of the main body 43 of the sub inflatable region 39 and extends in a front and rear direction. The middle partitioning region 75 divides the gas communication port 44 into the upper port 45 and lower port 46. The upper port 45 is disposed above the front edge 75*a* of the middle partitioning region 75 and the lower port 46 is disposed beneath the front edge 75*a* of the middle partitioning region 75.

Although the gas communication port 44 between the main body 43 and pillar-covering portion 42 of the sub inflatable region 39 is great in opening width, the middle partitioning region 75 divides the gas communication port 44 into two, thus prevents the main body 43 from absorbing a great deal of inflation gas G from the pillar-covering portion 42 when the pillar-covering portion 42 is inflated before the front main inflatable region 35 as fully inflated catches an occupant FO. Thus this configuration helps inflate the pillar-covering portion 42 quickly. It will be understood that the main body 43 of the sub inflatable region 39 will quickly absorb an inflation gas G (GRb, GRd) from the front main inflatable region 35 via the pillar-covering portion 42, and the upper port 45 and lower port 46 of the gas communication port 44, when an internal pressure of the front main inflatable region 35 soars. The middle partitioning region 75 further helps reduce the thickness of the main body 43 of the sub inflatable region 39 compared with those of the main inflatable regions 35 and 37 despite of its great volume, thus helps deploy the main body 43 smoothly with little engagement with surrounding vehicle members such as a door trim of the window W2 or a window pane of the window W2.

Figure 7:
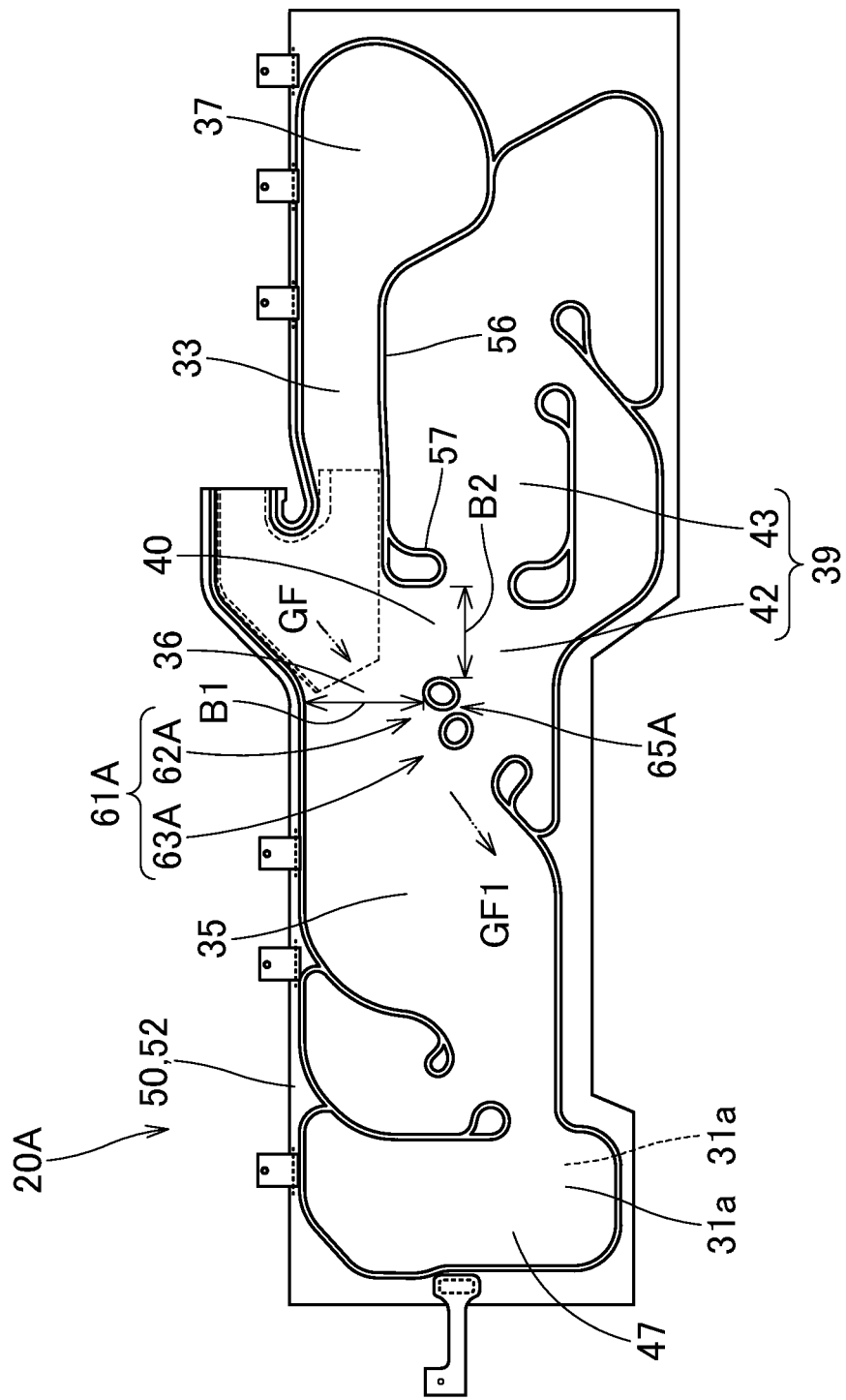
FIG. 7 is a front elevation of a modification of the airbag for head protection as laid flat.

Although the front partitioning region 61 is formed into a single island in the foregoing embodiment, the front partitioning region that interferes with a forward-flowing inflation gas GF and guides a greater portion GF1 of the gas GF towards the front main inflatable region 35 than towards the sub inflatable region 39 may be composed of more than one islands of non-receptive region. By way of example, a front partitioning region 61A of an airbag 20A shown in FIG. 7 is composed of two islands 62A and 63A which has a small opening 65A there between.

In a similar fashion to the foregoing embodiment, in the bag body 30 as laid flat, a width B1 of the gas passage 36 formed between the front partitioning region 61A and the upper portion 52*a* of the peripheral region 52 is greater than a width B2 of the rear gas communication passage 40 formed between the front partitioning region 61A and upper partitioning region 56.

Figure 8:
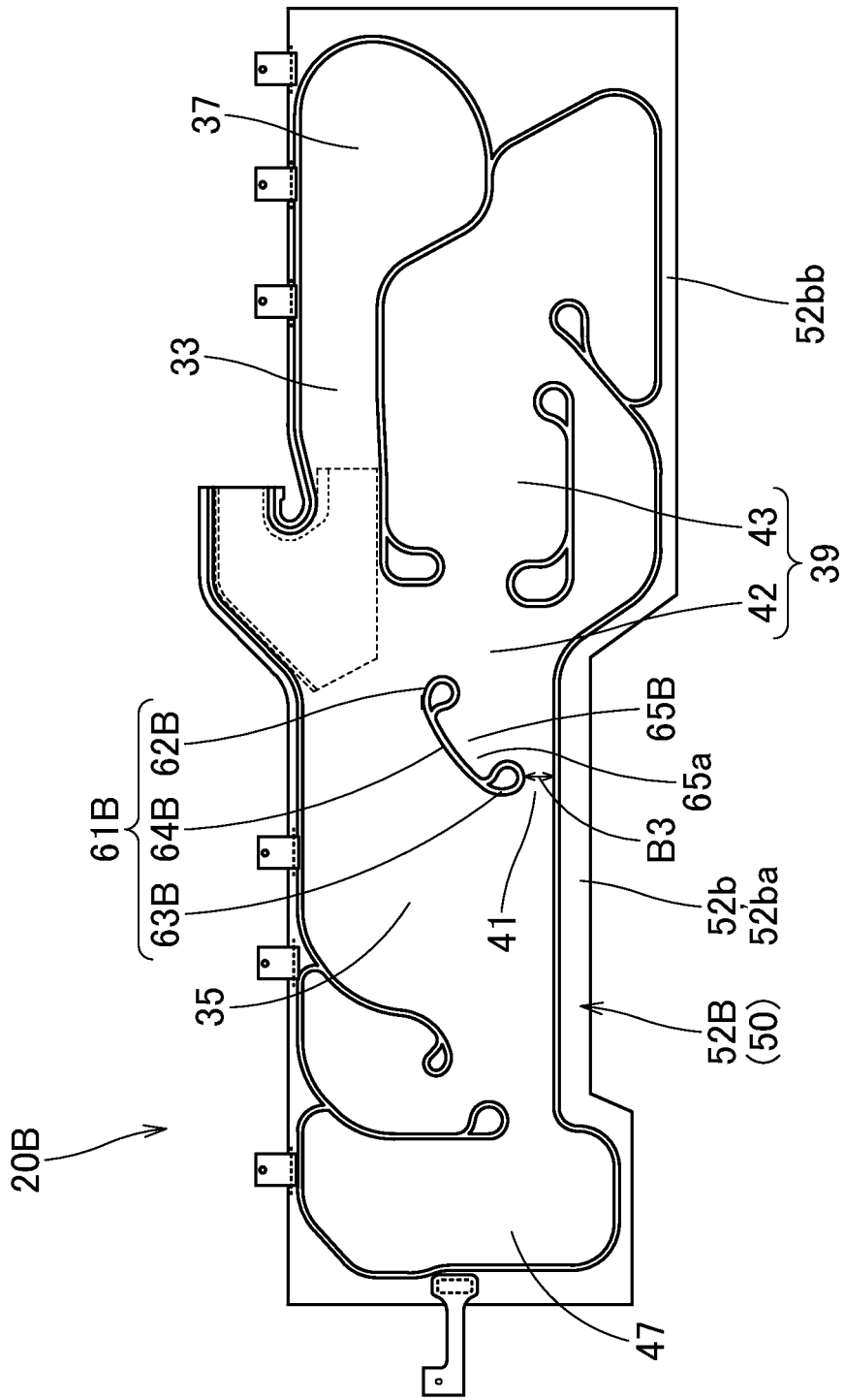
FIG. 8 is a front elevation of another modification of the airbag for head protection as laid flat.

In the airbag 20 of the foregoing embodiment, the lower gas communication passage 41 is disposed between the front partitioning region 61 and the upturned extended region 66 which extends upward from the lower portion 52*b* of the peripheral region 52. However, it is also conceivable not to form an upturned extended region 66 and form the lower gas communication passage 41 between the lower portion 52*b* of a peripheral region 52B and a front partitioning region 61B as in an airbag 20B shown in FIG. 8. In the airbag 20B, the front partitioning region 61B is formed into such a contour that a connecting portion 64B which connects upper and lower terminal portions 62B and 63B has a greater length in an up and down direction so as not to make an opening width B3 of the lower gas communication passage 41 too great.

Figure 9:
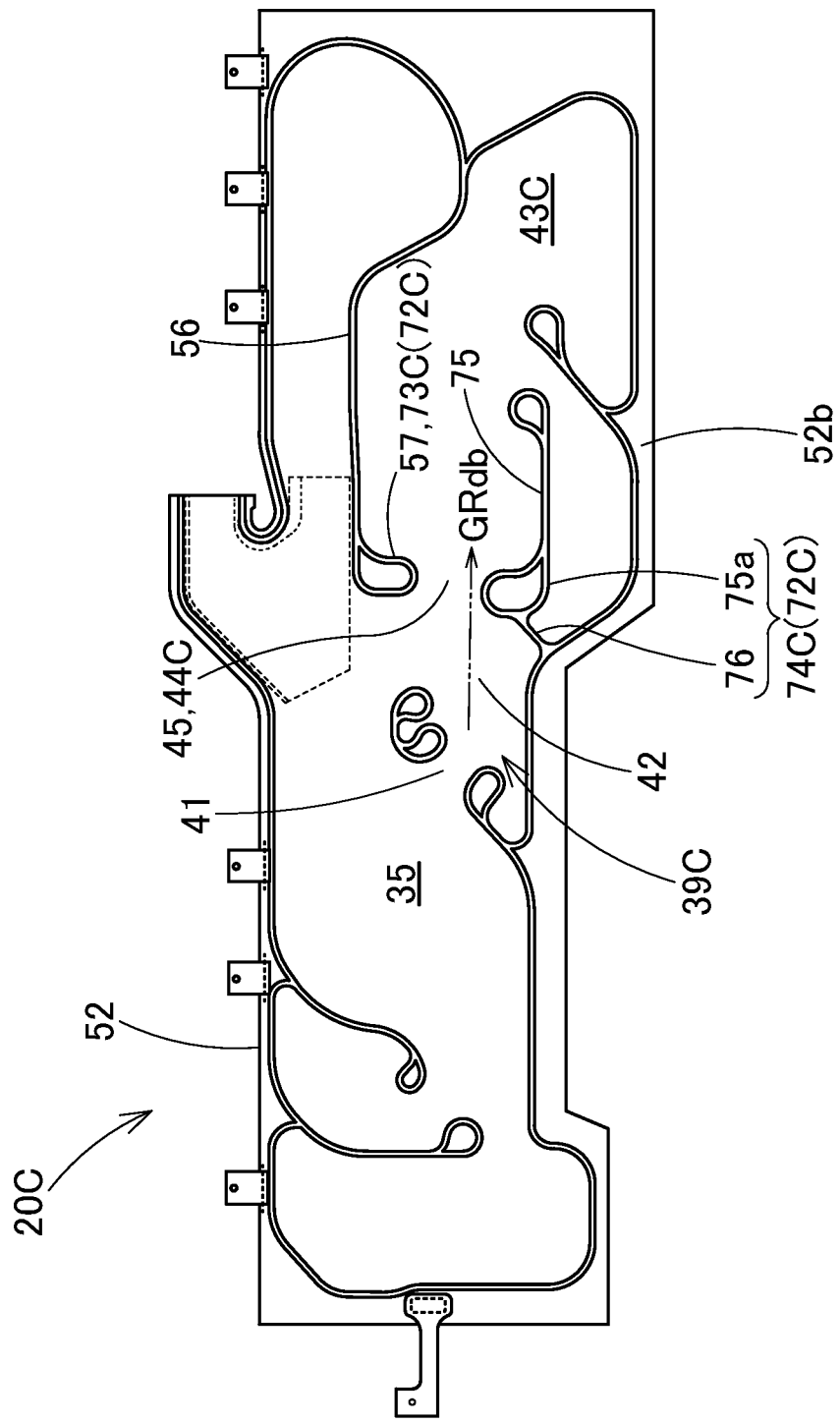
FIG. 9 is a front elevation of yet another modification of the airbag for head protection as laid flat.

In the airbag 20 of the foregoing embodiment, the gas communication port or namely, inlet port 44 of the main body 43 of the sub inflatable region 39, is divided into the upper port 45 and lower port 46. Alternatively, the inlet port of the main body 43 may be composed only of an upper port 45, as an inlet port 44C of an airbag 20C shown in FIG. 9. In the airbag 20C, a partition (sub inflatable region partitioning region) 72C that partitions the pillar-covering portion 42 and a main body 43C is composed of an upper portion 73C composed of the front end 57 of the upper partitioning region 56 and a lower portion 74C which includes the front end 75*a* of the middle partitioning region 75 and an extended region 76 that extends downwardly from the lower end of the front end 75*a* and continues to the lower portion 52*b* of the peripheral region 52.

Although the inlet port 44C in the airbag 20C does not include a lower port 46, the upper port 45 (i.e. the inlet port 44C) overlaps with the lower gas communication passage 41 (i.e. inlet port of the pillar-covering portion 42) in a front and rear direction. With this configuration, an inflation gas GRdb, which has flown into the pillar-covering portion 42 from the front main inflatable region 35 via the lower gas communication passage 41, is able to flow into the main body 43C directly via the upper port 45 with no need to be redirected. Therefore, the suppression of surge of internal pressure of the front main inflatable region 35 will be quickly conducted.

Figure 10:
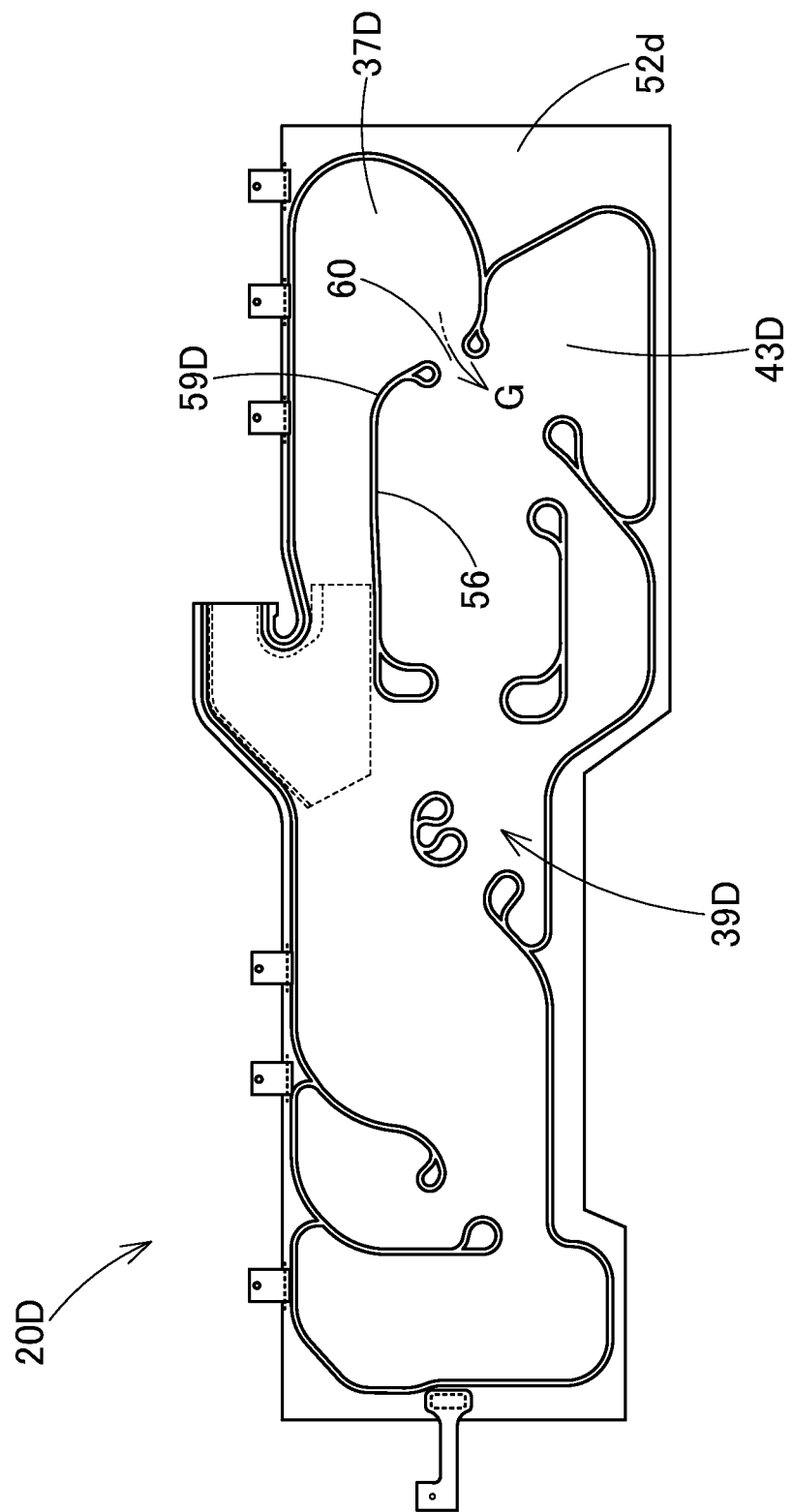
FIG. 10 is a front elevation of yet another modification of the airbag for head protection as laid flat.

In the airbag 20 of the foregoing embodiment, the rear partitioning region 59 is configured to shut out a gas communication between the main body 43 of the sub inflatable region 39 and the rear main inflatable region 37. Alternatively, the rear partitioning region may be provided with a communication port 60 which provides gas communication between the main body 43 of the sub inflatable region 39 and the rear main inflatable region 37, as a rear partitioning region 59D of an airbag 20D shown in FIG. 10. With this configuration, a main body 43D of a sub inflatable region 39D is able to absorb an inflation gas G from a rear main inflatable region 37D and help suppress a surge of internal pressure of the rear main inflatable region 37D when the rear main inflatable region 37D catches an occupant.

Figure 11:
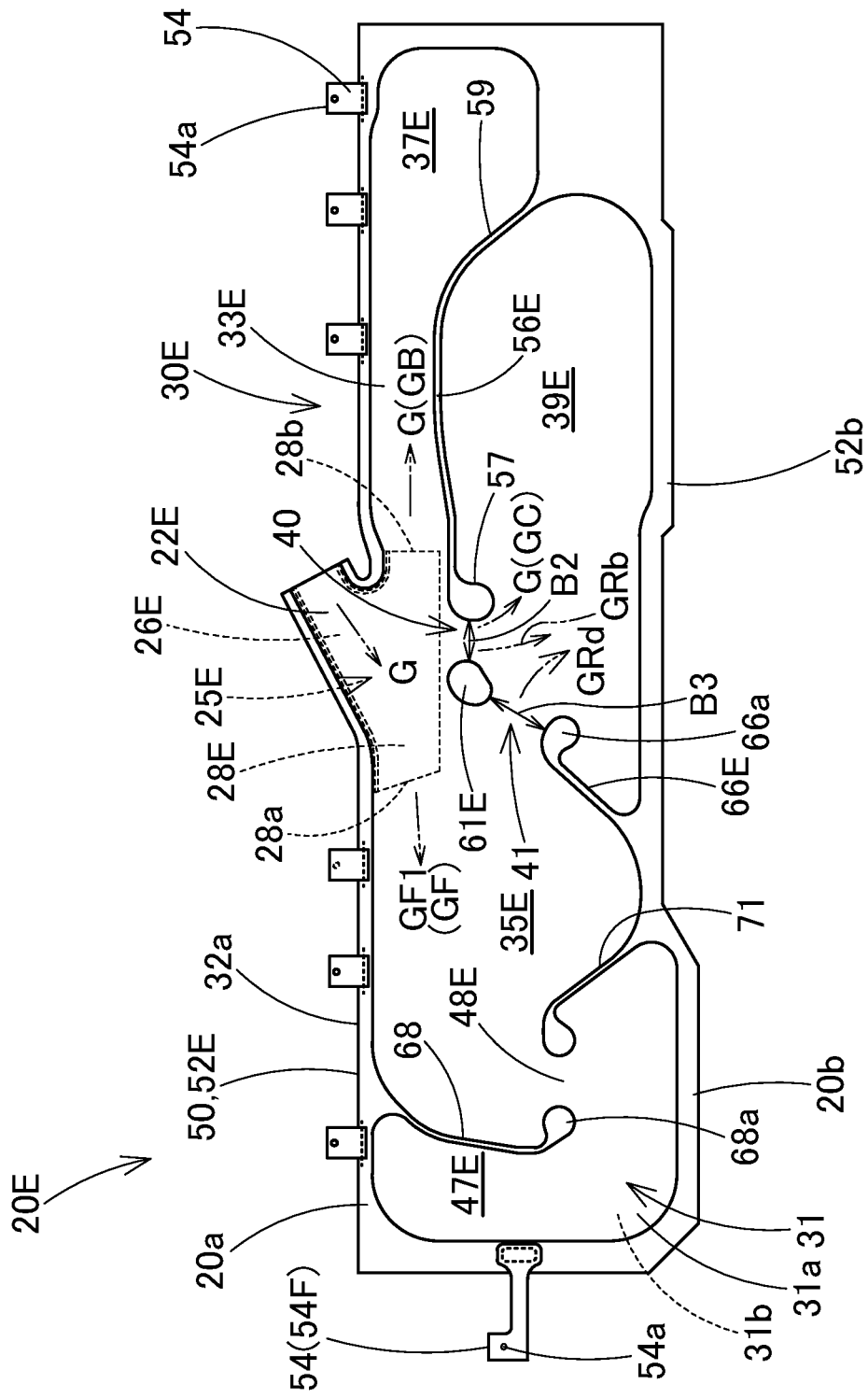
FIG. 11 is a front elevation of a further modification of the airbag for head protection as laid flat.

In the airbag 20 of the foregoing embodiment, the opening width B3 of the lower gas communication passage 41 disposed beneath the front partitioning region 61 is smaller than the opening width B2 of the rear gas communication passage 40 disposed at the rear of the front partitioning region 61. Alternatively, this relationship may be reversed, as in an airbag 20E for head protection shown in FIG. 11.

In the airbag 20E as so laid that the inboard side wall 31*a* and outboard side wall 31*b* lie flat over each other, a width B2 of the rear gas communication passage 40 disposed at the rear of a front partitioning region 61E is smaller than a width B3 of the lower gas communication passage 41 disposed beneath the front partitioning region 61E.

With this configuration, the rear gas communication passage 40 with the small width helps suppress an amount of inflation gas GC flowing into the sub inflatable region 39E in an initial stage of airbag deployment in which a bag body 30E takes in an inflation gas from an inlet port section 22E. Accordingly, an amount of inflation gas GF1 heading towards the front main inflatable region 35E will be increased and the front main inflatable region 35E will be inflated quickly.

Figure 13:
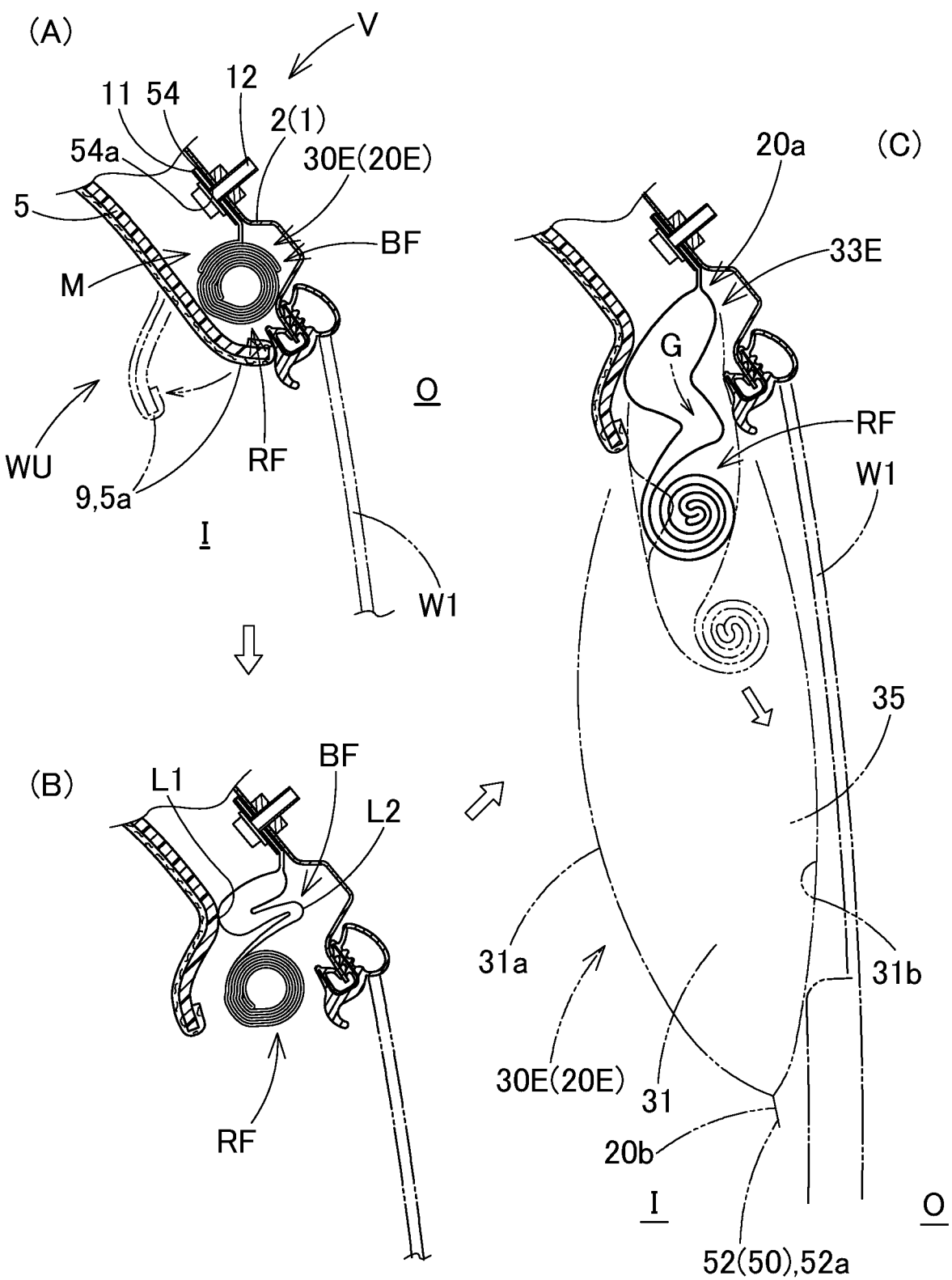
FIG. 13 illustrates a deployment process of the airbag of FIG. 11.

In a similar fashion to the airbag 20 of the foregoing embodiment, the airbag 20E includes a bag body 30E that is designed to emerge from a storage space disposed at upper peripheries WU ((A) of FIG. 13) of the windows and cover the windows when fed with an inflation gas G, and an inlet port section 22E that is disposed at a vicinity of the center in a front and rear direction of the upper edge of the bag body 30E for connection with an inflator 14 which emits an inflation gas G. The bag body 30E includes a gas receivable region 31 that is inflatable with the inflation gas G by separating an inboard side wall 31*a* from an outboard side wall 31*b*, and a non-receptive region 50 in which the inboard side wall 31*a* and outboard side wall 31*b* are attached together such that no inflation gas is admitted. As the gas receivable region 31, the airbag 20E includes a front main inflatable region 35E, a rear main inflatable region 37E, a gas feed path 33E, a sub inflatable region 39E, and a second sub inflatable region 47E, similarly to the airbag 20.

The front main inflatable region 35E is designed to be deployed at a side of the front seat, and the rear main inflatable region 37E is designed to be deployed at a side of the rear seat. The gas feed path 33E is disposed along the upper edge of the bag body 30E, in gas communication with the inlet port section 22E. The gas feed path 33E is also in gas communication with the front main inflatable region 35E and the rear main inflatable region 37E in order to deliver the inflation gas G as come over from the inlet port section 22E to the front and rear main inflatable regions 35E and 37E. The sub inflatable region 39E is disposed beneath the gas feed path 33E. The sub inflatable region 39E is designed to absorb the inflation gas G from the front main inflatable region 35E via the rear gas communication passage 40 and lower gas communication passage 41 when an internal pressure of the front main inflatable region 35E soars. The second sub inflatable region 47E is disposed in front of the front main inflatable region 35E. The second sub inflatable region 47E is designed to absorb the inflation gas G from the front main inflatable region 35E via an inlet port 48E when the internal pressure of the front main inflatable region 35E soars.

As the non-receptive region 50, the airbag 20E includes a peripheral region 52E that is disposed in an outer peripheral edge of the bag body 30E, an upper partitioning region 56E that partitions the sub inflatable region 39E from the gas feed path 33E, and a front partitioning region 61E that partitions the sub inflatable region 39E from the front main inflatable region 35E. The front partitioning region 61E is disposed at farther forward position than the front end 57 of the upper partitioning region 56E, and is formed into a generally round (or oval) island remote from other members of the non-receptive region 50, such that a gas passage (inlet port) 40 and a gas passage (inlet port) 41 of inflation gas G to the sub inflatable region 39E are formed at the rear of and beneath the front partitioning region 61E. The non-receptive region 50 further includes an edge partitioning region 68 that extends downwardly from an upper portion 52*a* of the peripheral region 52 and partitions the front main inflatable region 35E from the second sub inflatable region 47E, a linear shut region 71 which forms the inlet port 48E to the second sub inflatable region 47E in combination with the lower end 68a of the edge partitioning region 68, an upturned extended region 66E which extends diagonally rearwardly and upwardly from a portion of a lower portion 52b of the peripheral region 52 positioned in front of and below the front partitioning region 61E for forming the lower gas communication passage 41 beneath the front partitioning region 61E, and a rear partitioning region 59 which extends from the upper partitioning region 56E and partitions the rear main inflatable region 37E from the sub inflatable region 39E. The airbag 20E further includes a plurality of mounting regions 54, similarly to the airbag 20.

The front partitioning region 61E has such a width in an up and down direction that is generally identical to that of the front end 57 of the upper partitioning region 56E, and is located at the same height as the front end 57 of the upper partitioning region 56E. In other words, a clearance between the front partitioning region 61E and the lower portion 52b of the peripheral region 52E and a clearance between the front end 57 of the upper partitioning region 56E and the lower portion 52b of the peripheral region 52E are identical. Further, the front partitioning region 61E is disposed below a vicinity of the center in a front and rear direction of a connecting area between the inlet port section 22E and the bag body 30E.

Further, an inner tube 25E is disposed inside the airbag 20E, in an area extending across the inlet port section 22E and a region of the gas feed path 33E in a vicinity of the inlet port section 22E.

The inner tube 25E includes an insertion region 26E which is shaped to the inlet port section 22E extending obliquely upwardly and rearwardly and receives the inflator, and an outlet region 28E which is disposed beneath the insertion region 26E to be disposed in the gas feed path 33E. The outlet region 28E includes a front outlet port 28a for feeding an inflation gas as come over from the insertion region 26E to the front main inflatable region 35E and a rear outlet port 28b for feeding an inflation gas as come over from the insertion region 26E to the rear main inflatable region 37E. The rear outlet port 28b is disposed inside the gas feed path 33E, and the front outlet port 28a is disposed at a farther forward position than the inlet port section 22E on a forward extension of the gas feed path 33E.

Accordingly, the front partitioning region 61E is located farther rearward than and proximate to the front outlet port 28a of the inner tube 25E.

Assembling of an airbag device M for head protection using the airbag 20E as well as mounting of the airbag device M on the vehicle V is now described.

The airbag 20E is so laid that the inboard side wall 31a and outboard side wall 31b lie flat over each other, then folded up in such a manner that the lower edge 20b is brought close to the upper edge 20a, as can be seen in FIG. 12. In the illustrated embodiment, the gas feed path 33E is folded in a concertina-like fashion on two creases (or folds) L1 and L2 extending generally in a front and rear direction, thus forming a concertina-folded region BF, then an area below the gas feed path 33E is rolled on the outboard side wall 31b, thereby providing a roll-folded region RF. The airbag 20E as folded up is bound with a breakable shape-keeping member 85 (FIG. 1), in a similar fashion to the foregoing embodiment. Then the inflator 14 as coupled with the mounting bracket 16 is connected with the inlet port section 22E of the airbag 20E through the use of a clamp 15, and mounting brackets 11 are attached to the mounting regions 54 of the airbag 20E, thereby forming an airbag module. Subsequently, the mounting bracket 16 and mounting brackets 11 are placed at predetermined positions on the inner panel 2 of the vehicle body structure 1 and fixed there with the bolts 12 and 17. The inflator 14 is connected with a not-shown lead wire extending from a control device for actuating the inflator. If then a front pillar garnish 4, a roof head liner 5, pillar garnishes 6 and 7 are mounted on the inner panel 2, the airbag device M is mounted on the vehicle V, as can be seen in (A) of FIG. 13.

When the inflator 14 is actuated and feeds an inflation gas G to the airbag 20E thereafter, the gas G flows into the gas feed path 33E via the inlet port section 22E, such that the concertina-folded region BF unfolds and pushes the roll-folded region RB downward, and the roll-folded region RB unfolds, thus the airbag 20E is deployed over the windows W1 (W2) on an inboard side.

When the concertina-folded region BF unfolds, i.e. when the creases L1 and L2 of the concertina-folded region BF unfold, in an initial stage of airbag deployment, since the front partitioning region 61E is disposed in a vicinity of an immediately lower position of the inlet port section 22E in the airbag 20E, it is likely that an inflation gas G as flown out of the front outlet port 28a and rear outlet port 28b of the outlet region 28E of the inner tube 25E flows back towards the rear gas communication passage 40. To describe more specifically, referring to FIG. 11, most of the inflation gas G flowing into the bag body 30E bifurcates into GF and GB and flow into the front main inflatable region 35E and rear main inflatable region 37E via the front outlet port 28a and rear outlet port 28b of the outlet region 28E of the inner tube 25E. Nevertheless, in the initial stage of airbag deployment in which the creases L1 and L2 of the concertina-folded region BF unfold, a backflow of inflation gas can occur and the gas GC may flow into the sub inflatable region 39E via the rear gas communication passage 40. However, since the width B2 of the rear gas communication passage 40 is small, an amount of the inflation gas GC will be limited, such that the front main inflatable region 35E will be inflated quickly.

The same applies to an instance where no inner tube 25E is provided. With no inner tune 25E, when an inflation gas is taken into the inlet port section 22E of the airbag 20E and flows towards the front main inflatable region 35E, the front partitioning region 61E, which is disposed below and in a vicinity of the center in a front and rear direction of the inlet port section 22E, interferes with the gas, such that most of the gas flows into the front main inflatable region 35E except a small portion flowing into the sub inflatable region 39E via the rear gas communication passage 40. Since the width B2 of the rear gas communication passage 40 is small, however, an amount of the inflation gas flowing into the sub inflatable region 39E will be limited, such that the front main inflatable region 35E will be inflated quickly.

When the front main inflatable region 35E as fully inflated catches an occupant and gets the internal pressure raised thereafter, with no more inflow of the gas G from the inlet port section 22E, the inflation gas G in the front main inflatable region 35E bifurcates into GRd and GRb, each of which flows into the sub inflatable region 39E via the lower gas communication passage 41 disposed beneath the front partitioning region 61E as well as via the rear gas communication passage 40 disposed at the rear of the front partitioning region 61E. That is, the inflation gas G in the front main inflatable region 35E flows into the sub inflatable region 39E via two passages 40 and 41 disposed beneath and at the rear of the front partitioning region 61E, thus suppressing the internal pressure of the front main inflatable region 35E from soaring quickly.

At this time, since the width B3 of the lower gas communication passage 41 is greater than the width B2 of the rear gas communication passage 40, the inflation gas in the front main inflatable region 35E will smoothly move to the sub inflatable region 39E. That is, although the rear gas communication passage 40 has the small opening width B2 so as not to permit passage of a great deal of inflation gas in the initial stage of airbag deployment, when the internal pressure of the front main inflatable region 35E soars, the lower gas communication passage 41 as well as the rear gas communication passage 40 feed a great deal of inflation gas to the sub inflatable region 39E from the front main inflatable region 35E, such that an elevation of the internal pressure of the front main inflatable region 35E will be suppressed quickly.

As described above, in the airbag 20E, the inner tube 25E is disposed in the area extending across the inlet port section 22E and the region of the gas feed path 33E in the vicinity of the inlet port section 22E. The inner tube 25E includes the front outlet port 28a that releases the inflation gas towards the front main inflatable region 35E and the rear outlet port 28b that releases the inflation gas towards the rear main inflatable region 37E. The front partitioning region 61E is disposed farther rearward than and proximate to the front outlet port 28a of the inner tube 25E.

With this configuration, since the front partitioning region 61E is disposed farther rearward than and proximate to the front outlet port 28a of the inner tube 25E, an inflation gas released from the front outlet port 28a flows into the front main inflatable region 35E and inflates the same quickly with little interference with the front partitioning region 61E. Even in the initial stage of airbag deployment in which the airbag 20E takes in an inflation gas via the inlet port section 22E, the inflation gas can hardly flow towards the rear gas communication passage 40 disposed at the rear of the front partitioning region 61E, such that the front main inflatable region 35E is inflated quickly. When the front main inflatable region 35E as fully inflated catches an occupant and gets the internal pressure raised thereafter, the inflation gas G (GRd, GRb) in the front main inflatable region 35E flows into the sub inflatable region 39E via the two passages, i.e. the lower gas communication passage 41 and rear gas communication passage 40 disposed beneath and at the rear of the front partitioning region 61E. Thus the internal pressure of the front main inflatable region 35E is prevented from soaring quickly.

In the airbag 20E, moreover, the non-receptive region 50 of the bag body 30E includes, at a lower front position of the front partitioning region 61E, the upturned extended region 66E that extends upwardly from the lower portion 52b of the peripheral region 52E and defines the width of the lower gas communication passage 41 disposed beneath the front partitioning region 61E.

The upturned extended region 66E prevents an inflation gas G as flown into the front main inflatable region 35E from escaping to the sub inflatable region 39E via the lower gas communication port 41 until the front main inflatable region 35E completes inflation. That is, in a stage before full inflation of the front main inflatable region 35E, the upturned extended region 66E controls a flow rate of an inflation gas G (GRd) flowing into the sub inflatable region 39E via the lower gas communication port 41, thus helping inflate the front main inflatable region 35E further quickly.

In the foregoing embodiments, the front partitioning region 61 has been described as formed by joining the inboard side wall 31a and outboard side wall 31b directly. However, as long as it partitions the sub inflatable region 39 from the front main inflatable region 35, the front partitioning region 61 may also be formed by joining the inboard side wall 31a and outboard side wall 31b indirectly, through the medium of a tether, by way of example. The same applies to other airbags 20A, 20B, 20C, 20D and 20E.

What is claimed is:

1. An airbag for head protection which is adapted to be stored, in a folded-up configuration, in a storage space disposed along upper peripheries of windows located at outboard sides of a front seat and a rear seat of a vehicle, the airbag comprising:
   a bag body that emerges from the storage space and is deployed over the windows in an interior of the vehicle when fed with an inflation gas, the bag body including an inboard side wall, an outboard side wall, a gas receivable region that is inflatable with the inflation gas by separating the inboard side wall from the outboard side wall, and a non-receptive region in which the inboard side wall and outboard side wall are attached together such that no inflation gas is admitted; and
   an inlet port section that is disposed at a vicinity of a center in a front and rear direction of an upper edge of the bag body for connection with an inflator which feeds the inflation gas,
   wherein the gas receivable region includes:
   a front main inflatable region that is deployable in a vicinity of an outboard side of the front seat;
   a rear main inflatable region that is deployable in a vicinity of an outboard side of the rear seat;
   a gas feed path that is in gas communication with the inlet port section and disposed along the upper edge of the bag body, the gas feed path being in gas communication with the front main inflatable region and the rear main inflatable region in order to deliver the inflation gas as come over from the inlet port section to the front and rear main inflatable regions; and
   a sub inflatable region that is disposed beneath the gas feed path and absorbs the inflation gas from the front main inflatable region when an internal pressure of the front main inflatable region soars,
   wherein the non-receptive region includes:
   a peripheral region that is arranged in an outer peripheral edge of the bag body;
   an upper partitioning region that partitions the sub inflatable region from the gas feed path; and
   a front partitioning region that partitions the sub inflatable region from the front main inflatable region, the front partitioning region being disposed in front of a front end of the upper partitioning region in an island-like fashion remote from other members of the non-receptive region so as to provide, at the rear of and beneath the front partitioning region, a rear gas communication passage and a lower gas communication passage that each provide gas communication between the front main inflatable region and the sub inflatable region,
   wherein
   the sub inflatable region includes:
   a pillar-covering portion that is deployable at an inboard side of a pillar disposed between the front seat and the rear seat;
   a main body that is disposed at the rear of the pillar-covering portion; and
   a partition that belongs to the non-receptive region and partitions the pillar-covering portion from the main body while providing a gas communication port between the pillar-covering portion and the main body,
   the lower gas communication passage overlaps the gas communication port in a front and rear direction, the non-receptive region further includes a middle partitioning region that is disposed at a generally center in an up and down direction of the main body of the sub inflatable region and extends in a front and rear direction;

the middle partitioning region divides the gas communication port that provides gas communication between the pillar-covering portion and the main body into an upper port and a lower port; and the upper port is disposed above a front edge of the middle partitioning region and the lower port is disposed beneath the front edge of the middle partitioning region.

2. The airbag for head protection of claim 1, wherein, in the bag body as laid such that the inboard side wall and outboard side wall lie flat over each other, the rear gas communication passage is smaller in width than the lower gas communication passage.

3. The airbag for head protection of claim 2, wherein:

an inner tube is disposed in an area extending across the inlet port section and a region of the gas feed path in a vicinity of the inlet port section;

the inner tube includes a front outlet port that releases the inflation gas towards the front main inflatable region and a rear outlet port that releases the inflation gas towards the rear main inflatable region; and the front partitioning region is disposed farther rearward than and proximate to the front outlet port of the inner tube.

4. The airbag for head protection of claim 2, wherein the non-receptive region of the bag body further includes, at a lower front position of the front partitioning region, an upturned extended region that extends upwardly from a lower portion of the peripheral region and defines a width of the lower gas communication passage disposed beneath the front partitioning region.

5. The airbag for head protection of claim 1, wherein:

the front partitioning region is disposed in front of the front end of the upper partitioning region and below the gas feed path; and in the bag body as laid such that the inboard side wall and outboard side wall lie flat over each other, a width of a gas passage formed between the front partitioning region and an upper portion of the peripheral region is greater than a width of the rear gas communication passage.

6. The airbag for head protection of claim 1, wherein:

an inner tube is disposed in an area extending across the inlet port section and a region of the gas feed path in a vicinity of the inlet port section;

the inner tube includes a front outlet port that releases the inflation gas towards the front main inflatable region and a rear outlet port that releases the inflation gas towards the rear main inflatable region; and the front partitioning region is disposed proximate to the front outlet port of the inner tube.

7. The airbag for head protection of claim 1, wherein the non-receptive region of the bag body further includes, below the front partitioning region, an upturned extended region that extends upwardly from a lower portion of the peripheral region and defines a width of the lower gas communication passage disposed beneath the front partitioning region.

8. The airbag for head protection of claim 1, wherein the bag body further comprises, in front of the front main inflatable region, a second sub inflatable region that absorbs the inflation gas from the front main inflatable region when the internal pressure of the front main inflatable region soars.

9. The airbag for head protection of claim 1, wherein:

the front partitioning region is formed into such a shape that includes a generally round upper terminal portion, a generally round lower terminal portion and a connecting portion that connects the upper terminal portion and lower terminal portion;

the lower terminal portion is disposed at a diagonally lower front position of the upper terminal portion; and the connecting portion connects the upper terminal portion and lower terminal portion at edges facing away from the sub inflatable region such that a recessed region is formed adjacent the sub inflatable region in such a manner as to dent towards a direction away from the sub inflatable region between the upper and lower terminal portions.

10. The airbag for head protection of claim 1, wherein a rear portion of the sub inflatable region overlap with at least a front portion of the rear main inflatable region in an up and down direction.

11. An airbag for head protection which is adapted to be stored, in a folded-up configuration, in a storage space disposed along upper peripheries of windows located at outboard sides of a front seat and a rear seat of a vehicle, the airbag comprising:

a bag body that emerges from the storage space and is deployed over the windows in an interior of the vehicle when fed with an inflation gas, the bag body including an inboard side wall, an outboard side wall, a gas receivable region that is inflatable with the inflation gas by separating the inboard side wall from the outboard side wall, and a non-receptive region in which the inboard side wall and outboard side wall are attached together such that no inflation gas is admitted; and an inlet port section that is disposed at a vicinity of a center in a front and rear direction of an upper edge of the bag body for connection with an inflator which feeds the inflation gas, wherein the gas receivable region includes:

a front main inflatable region that is deployable in a vicinity of an outboard side of the front seat;

a rear main inflatable region that is deployable in a vicinity of an outboard side of the rear seat;

a gas feed path that is in gas communication with the inlet port section and disposed along the upper edge of the bag body, the gas feed path being in gas communication with the front main inflatable region and the rear main inflatable region in order to deliver the inflation gas as come over from the inlet port section to the front and rear main inflatable regions; and a sub inflatable region that is disposed beneath the gas feed path and absorbs the inflation gas from the front main inflatable region when an internal pressure of the front main inflatable region soars, wherein the non-receptive region includes:

a peripheral region that is arranged in an outer peripheral edge of the bag body, an upper partitioning region that partitions the sub inflatable region from the gas feed path, and a front partitioning region that partitions the sub inflatable region from the front main inflatable region, the front partitioning region being disposed in front of a front end of the upper partitioning region in an island-like fashion remote from other members of the non-receptive region so as to provide, at the rear of and beneath the front partitioning region, a rear gas communication passage and a lower gas communication passage that each provide gas communication between the front main inflatable region and the sub inflatable region;

a lower edge of the sub inflatable region is disposed below a lower edge of the front main inflatable region;

the sub inflatable region is located at a rear of the front main inflatable region;

a lower portion of the peripheral region includes a front portion and a rear portion;

the rear portion of the lower portion is disposed farther downward than the front portion of the lower portion;

the sub inflatable region includes:
- a pillar-covering portion that is deployable at an inboard side of a pillar disposed between the front seat and the rear seat,
- a main body that is disposed at the rear of the pillar-covering portion, and
- a partition that belongs to the non-receptive region and partitions the pillar-covering portion from the main body while providing a gas communication port between the pillar-covering portion and the main body;

the lower gas communication passage overlaps the gas communication port in a front and rear direction;

the non-receptive region further includes a middle partitioning region that is disposed at a generally center in an up and down direction of the main body of the sub inflatable region and extends in a front and rear direction;

the middle partitioning region divides the gas communication port that provides gas communication between the pillar-covering portion and the main body into an upper port and a lower port; and the upper port is disposed above a front edge of the middle partitioning region and the lower port is disposed beneath the front edge of the middle partitioning region.

* * * * *